United States Patent
Ren et al.

(10) Patent No.: US 8,327,129 B2
(45) Date of Patent: Dec. 4, 2012

(54) METHOD, APPARATUS AND SYSTEM FOR INTERNET KEY EXCHANGE NEGOTIATION

(75) Inventors: Weichen Ren, Beijing (CN); Xudong Zou, Beijing (CN); Zhanming Wei, Beijing (CN); Xiangqing Chang, Beijing (CN)

(73) Assignee: Hangzhou H3C Technologies Co., Ltd., Hangzhou (CN)

( * ) Notice: Subject to any disclaimer, the term of this patent is extended or adjusted under 35 U.S.C. 154(b) by 309 days.

(21) Appl. No.: 12/808,978

(22) PCT Filed: Jun. 23, 2008

(86) PCT No.: PCT/CN2008/071411
§ 371 (c)(1),
(2), (4) Date: Jun. 17, 2010

(87) PCT Pub. No.: WO2009/082889
PCT Pub. Date: Jul. 9, 2009

(65) Prior Publication Data
US 2010/0313023 A1 Dec. 9, 2010

(30) Foreign Application Priority Data
Jan. 3, 2008 (CN) .......................... 2008 1 0055994

(51) Int. Cl.
*H04L 29/06* (2006.01)
(52) U.S. Cl. ...................... 713/153; 713/171; 380/283
(58) Field of Classification Search .................. 713/153, 713/171; 380/283
See application file for complete search history.

(56) References Cited

U.S. PATENT DOCUMENTS

| 7,996,670 | B1 * | 8/2011 | Krishna et al. ................. 713/162 |
| 2002/0097724 | A1 * | 7/2002 | Halme et al. ................... 370/392 |
| 2007/0220250 | A1 | 9/2007 | Tamura |

FOREIGN PATENT DOCUMENTS

| CN | 1937571 A | 3/2007 |
| CN | 1984131 A | 6/2007 |
| CN | 101197664 A | 6/2008 |
| CN | 1863048 B | 4/2012 |
| JP | 2005210555 A | 8/2005 |

OTHER PUBLICATIONS

R. Friend, "Making the Gigabit IPSec VPN Architecture Secure," IEEE Computer, vol. 37, No. 6, pp. 54-60, Jun. 2004.*
English translation of the First Office Action from Chinese Application No. 2008100559941, dated Jan. 29, 2010.

* cited by examiner

*Primary Examiner* — Kambiz Zand
*Assistant Examiner* — Michael Guirguis
(74) *Attorney, Agent, or Firm* — Marshall, Gerstein & Borun LLP

(57) ABSTRACT

The present invention discloses a method, an apparatus, and a system for IKE negotiation. One method comprises: upon receiving a data packet, selecting one of multiple service cards according to a pre-configured policy and triggering the service card to send an IKE negotiation packet; and saving the mapping between the IKE negotiation packet and the service card. The other method comprises: upon receiving an IKE negotiation packet, selecting one of multiple service cards according to a pre-configured policy, triggering the service card to perform IKE negotiation, and saving the mapping between of the IKE negotiation packet and the service card. The solution enables a network node a node to distribute IKE negotiations to different service cards to perform IKE negotiation at the same time, improving IKE negotiation speed.

22 Claims, 10 Drawing Sheets

METHOD, APPARATUS AND SYSTEM FOR INTERNET KEY EXCHANGE NEGOTIATION

TECHNICAL FIELD

This invention relates in general to the field of network security, and more particular to a method, apparatus and system for Internet key exchange (IKE) negotiation.

BACKGROUND OF THE INVENTION

IP Security (IPsec) provides transparent security services for IP communications, protects TCP/IP communications from tampering and eavesdropping, and effectively protects against network attacks. IPsec provides access control, connectionless integrity, data origin authentication, anti-replay service, and confidentiality. IPsec comprises a series of protocols for IP data security, including Authentication Header (AH), Encapsulating Security Payload (ESP), IKE, and algorithms for authentication and encryption.

The two ends using IPsec for packet transmission are called IPsec peers. The connection between these two peers is called an IPsec tunnel or IPsec connection.

IPsec uses security associations (SAs) to protect packets between two peers. An SA is a set of elements including the security protocols, encapsulation mode, encryption algorithm, shared key, and key lifetime. Because an SA is unidirectional, each peer must have two SAs (inbound SA and outbound SA) to protect bidirectional communications. The inbound SA encrypts the incoming packets and the outbound SA decrypts outgoing packets. The inbound direction is the direction in which traffic enters the IPsec tunnel, and the outbound direction is the direction in which traffic goes out of the IPsec tunnel.

An SA can be created manually (Manual) or through IKE negotiation (ISAKMP).

A pair of IPsec peers such as two network nodes performs IKE negotiation to negotiate the security protocols, exchange IPsec authentication and encryption keys, and manage the negotiated keys.

In a one-to-many network scenario as shown in FIG. 1, one network node communicates with other nodes. This application requires IKE negotiation to implement IPsec. The core site connects to each remote site over a VPN connection, but the remote sites do not set up VPN connections among one another. Remote sites carry out VPN communications with one another through the core site. For this purpose, the core site must be capable of concurrently establishing an IPSec connection and SAs to each remote site. In this case, IKE negotiation is recommended.

In a current solution, the network nodes of the core and remote sites each use a main board to implement IKE negotiation. The main board processes all sent and received IKE negotiation requests. Generally a node is equipped with one IKE negotiation main board, and the processing capability of the board is limited. When the core site is establishing IPsec connections with multiple remote sites, the IKE negotiation main board on the core site needs to handle multiple IKE negotiation processes and thus cannot ensure high efficiency.

SUMMARY OF THE INVENTION

The present invention provides a method, apparatus, and system for IKE negotiation to improve the IKE negotiation speed.

A method for IKE negotiation provided by the present invention comprises: upon receiving a data packet, selecting one of multiple service cards according to a pre-configured policy and triggering the service card to send an IKE negotiation packet for the data packet; saving the mapping between the IKE negotiation packet and the service card.

Another method for IKE negotiation provided by the present invention comprises: upon receiving an IKE negotiation packet, selecting one of multiple service cards according to a pre-configured policy and triggering the service card to perform IKE negotiation; saving the mapping between the IKE negotiation packet and the service card.

The apparatus for IKE negotiation provided by the present invention comprises: a transmitting and receiving unit that receives data packets and sends IKE negotiation packets for the data packets; a pre-processing unit that selects one of multiple service cards according to a pre-configured policy and triggers the service card; service cards that generate IKE negotiation packets for data packets after being triggered; a storage unit that saves the mapping between the IKE negotiation packet and the service card.

Another apparatus for IKE negotiation provided by the present invention comprises: a transmitting and receiving unit that receives IKE negotiation packets; a pre-processing unit that selects one of multiple service cards according to a pre-configured policy and triggers the service card upon receiving an IKE negotiation packet; service cards that perform IKE negotiation after being triggered; a storage unit that saves the mapping between the IKE negotiation packet and the service card.

The IKE negotiation method, apparatus, and system of the present invention:

Upon receiving a data packet, trigger a service card according to a pre-configured policy to send an IKE negotiation packet, and save the service card triggering mapping for the IKE negotiation packet; Upon receiving an IKE negotiation packet, trigger a service card to perform IKE negotiation according to a pre-configured policy, and save the mapping between the negotiation packet and the service card. This solution distributes IKE negotiation tasks to different service cards of a device, instead of the main board. The distributed processing allows a node to simultaneously set up a large number of IPsec connections with remote sites. The negotiation speed is thus greatly improved.

DETAILED DESCRIPTION OF THE INVENTION

To clarify the purposes, technical proposals, and advantages of the present invention, the following describes the present invention in detail in conjunction with the figures and embodiments.

The method, apparatus, and system for IKE negotiation provided by the present invention, upon receiving a data packet, trigger a service card to send an IKE negotiation packet according to a pre-configured policy, and save the service card triggering mapping for the IKE negotiation packet. One or more service cards can be equipped to replace the IKE negotiation main board in the existing technology. IKE negotiation tasks are distributed to service cards to improve the IKE negotiation speed of network nodes.

The following describes in detail the embodiments of the present invention.

Embodiment 1

The following describes the initiating method and responding method of embodiment 1.

Figure 1:
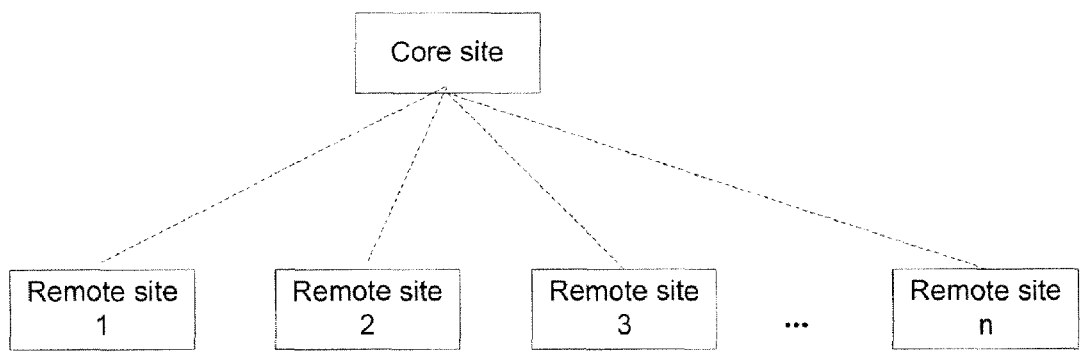
FIG. 1 is a schematic diagram illustrating a one-to-many network.
Figure 2:
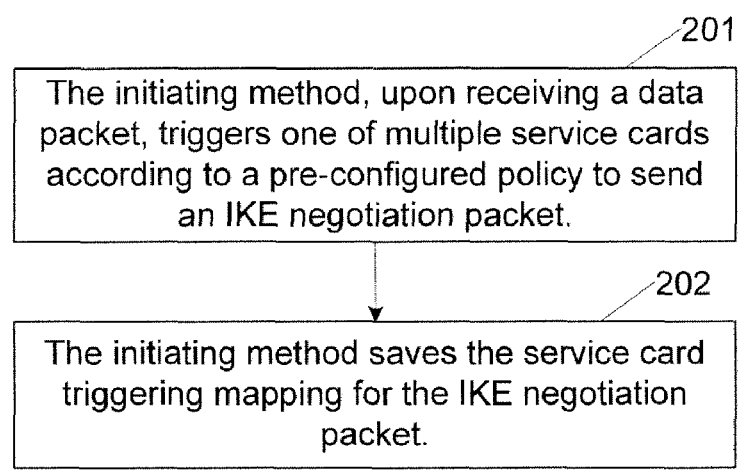
FIG. 2 is a flow chart of the IKE negotiation initiating method of embodiment 1 of the present invention.

FIG. 2 is a flow chart of the IKE negotiation initiating method of embodiment 1 of the present invention. As shown in FIG. 2, the detailed procedure comprises the following steps:

At step 201, the initiating method selects one of multiple service cards according to a pre-configured policy after receiving a data packet, and triggers the service card to send an IKE negotiation packet in response to the data packet.H At step 202, the initiating method saves the service card triggering mapping for the IKE negotiation packet.

Figure 3:
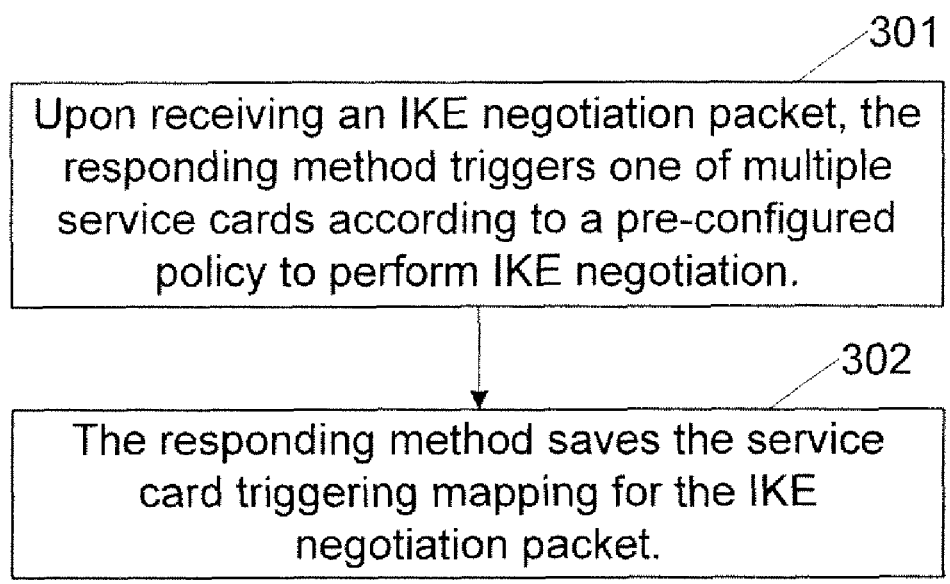
FIG. 3 is a flow chart of the IKE negotiation response method of embodiment 1 of the present invention.

FIG. 3 is a flow chart of the IKE negotiation responding method of embodiment 1 of the present invention. As shown in FIG. 3, the procedure comprises the following steps:

At step 301, upon receiving an IKE negotiation packet, the responding method selects one of multiple service cards according to a pre-configured policy, and triggers the service card to perform IKE negotiation.

At step 302, the responding method saves the service card triggering mapping for the IKE negotiation packet.

The following describes the IKE negotiation system of embodiment 1. The system comprises an initiating apparatus and a responding apparatus.

Upon receiving a data packet, the initiating apparatus selects one of multiple service cards according to a pre-configured policy, triggers the service card to send an IKE negotiation packet to the responding apparatus, and saves the service card triggering mapping for the IKE negotiation packet.

Upon receiving an IKE negotiation packet, the responding apparatus selects one of multiple service cards according to a pre-configured policy, triggers the service card to process the IKE negotiation, and saves the service card triggering mapping for the IKE negotiation packet.

The pre-configured policy can use the Hash algorithm to calculate a received data packet and select a service card with the ID equal to the calculation result, or select an idle service card, or select a service card with higher processing capability, or select a service card in a preset order, or select a service card randomly.

The service card triggering mapping for the IKE negotiation packet can be the mapping between the unique identifier of the IKE negotiation packet and the unique identifier (service card ID) of the service card.

Figure 4:
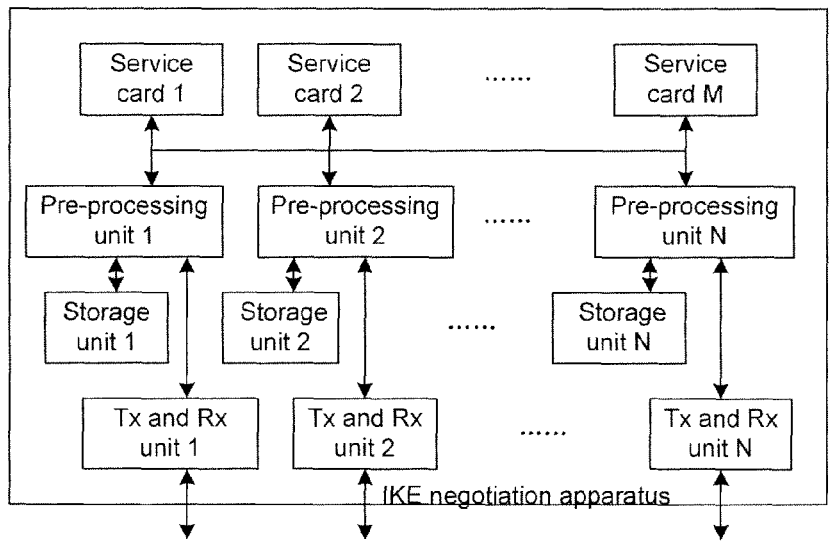
FIG. 4 is the block diagram of the IKE negotiation apparatus of embodiment 1 of the present invention.

More specifically, FIG. 4 is the block diagram of the IKE negotiation apparatus of embodiment 1 of the present invention. The apparatus can be an initiating apparatus or a responding apparatus depending on the functions of its units. As shown in FIG. 4, the initiating apparatus comprises a transmitting and receiving unit, a pre-processing unit, service cards, and a storage unit.

Wherein, the transmitting and receiving unit receives data packets, and sends IKE negotiation packets in response to the received data packets.

The pre-processing unit selects one of multiple service cards according to a pre-configured policy, and triggers the service card to take proper actions.

The service card generates IKE negotiation packets after being triggered.

The storage unit saves the mappings between IKE negotiation packets and the service cards that generate the negotiation packets.

The responding apparatus comprises a transmitting and receiving unit, a pre-processing unit, service cards, and a storage unit.

Wherein, the transmitting and receiving unit receives IKE negotiation packets.

The pre-processing unit selects one of multiple service cards according to a pre-configured policy, and triggers the service card to take a proper action.

The service cards perform IKE negotiation after being triggered.

The storage unit saves the mappings between IKE negotiation packets and the service cards that process the packets.

As shown in FIG. 4, there are M service cards, N pre-processing units, N transmitting and receiving units, and L storage units. M, N, and L are all equal to or greater than 1, and their values can be different or the same. As the IKE negotiation processing services increase, it is required to increase the number of the service cards to improve the IKE negotiation speed.

The method, apparatus, and system for IKE negotiation of embodiment 1, upon receiving a data packet, trigger a service card according to a pre-configured policy to send an IKE negotiation packet in response to a received data packet, saves the service card triggering mapping for the IKE negotiation packet; upon receiving an IKE negotiation packet, trigger a service card according to a pre-configured policy to perform IKE negotiation, and save the service card triggering mapping for the IKE negotiation packet.

Embodiment 1 of this invention allows a network node to distribute massive concurrent IPsec negotiation tasks to different service cards to improve IKE negotiation speed. Compared to the current solution where the main board processes all IKE negotiations, the distributed processing method avoids efficiency degradation.

Embodiment 2

Based on embodiment 1, the following describes the IKE negotiation method and apparatus of embodiment 2.

The following describes the initiating method of embodiment 2.

Figure 5:
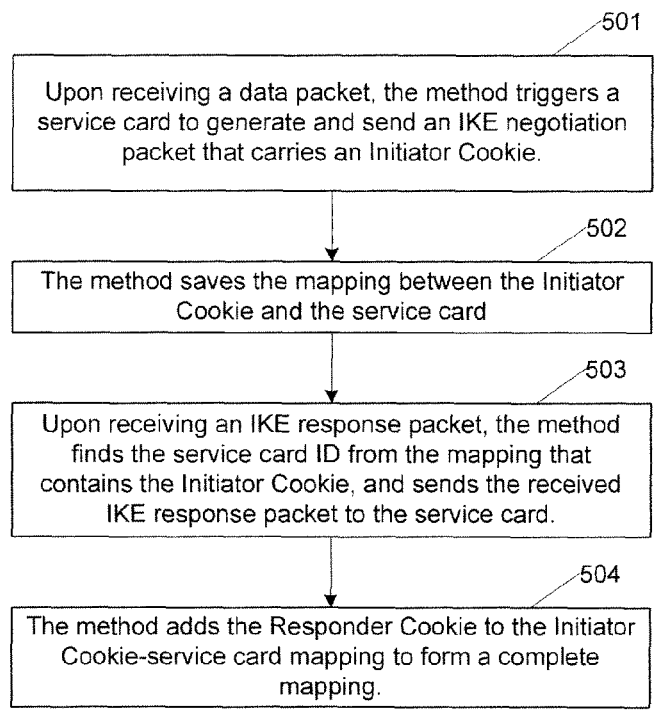
FIG. 5 is a flow chart of the IKE negotiation initiating method of embodiment 2 of the present invention.

FIG. 5 is a flow chart of the IKE negotiation initiating method of embodiment 2 of the present invention. The procedures comprise the following steps:

At step 501, upon receiving a data packet, the method triggers a service card to generate an Initiator Cookie according to a pre-configured policy, and triggers the service card to generate and send an IKE negotiation packet that carries the Initiator Cookie.

In detail, the method can use the Hash algorithm to calculate some bits in the received packet, and use the calculation result as the service card ID to select a service card. Then the service card is triggered to perform IKE negotiation. Other pre-configured policies can also be used in actual applications.

As described in RFC 2408, IKE auto negotiation (ISAKMP) falls two phases. In phase 1, an ISAKMP SA is established to be used as a control channel for negotiating an IPsec ISAKMP channel. In phase 2, using the ISAKMP SA, the two peers negotiates IKE SAs, including the encryption key, authentication key, encryption key, and authentication algorithm.

The ISAKMP channel as a control channel is the SA and private key management protocols channel established between the initiating apparatus and responding apparatus of embodiment 2. The ISAKMP packets for establishing an IKE auto-negotiation control channel comprise ISAKMP initiating and ISAKMP response packets.

RFC 2408 specifies that two Cookie fields in the ISAKMP header, Initiator Cookie and Responder Cookie, uniquely identify an ISAKMP packet, namely, an IPsec connection. The Initiator Cookie, generated by the service card of the initiating apparatus, identifies the initiating apparatus. The Responder Cookie, generated by the service card of the responding apparatus, identifies the responding apparatus. At this step, the service card of the initiating apparatus first generates the Initiator Cookie.

Figure 6:
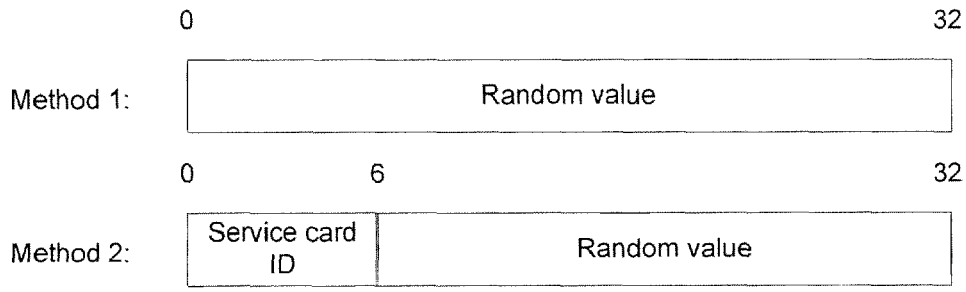
FIG. 6 is the format diagram of the Initiator Cookie of embodiment 2 of the present invention.

FIG. 6 is the format diagram of the Initiator Cookie of embodiment 2 of the present invention. As shown in this figure, the service card follows either of two methods to generate an Initiator Cookie. The first method generates a random value as the Initiator Cookie. For example, a generated random 32-bit value is used as the Initiator Cookie. The second method uses the service card ID and a random value to generate the Initiator Cookie. For example, the service card ID takes the first 6 bits of the 32-bit Cookie, and the random value takes the rest bits. The second method can prevent service cards from generating duplicate Initiator Cookies that cause the correspondence of ISAKMP channels and service cards to not be identified.

The service card can use either of the two methods to generate the Initiator Cookie in embodiment 2.

Then the service card generates an ISAKMP initiating packet whose header contains the Initiator Cookie, and sends this packet.

At step 502, the method saves the mapping between the Initiator Cookie and the service card ID.

RFC 2408 specifies that the IKE initiating apparatus and responding apparatus exchange multiple ISAKMP packets during IKE auto negotiation. To ensure that the ISAKMP packets transmitted on the same ISAKMP channel is processed by the same service card, both the initiating apparatus and responding apparatus need to save the mapping between the ISAKMP channel and the service card. Because embodiment 2 of the present invention uses the Initiator Cookie and Responder Cookie fields to uniquely identify an ISAKMP channel, the method saves the mapping among Initiator Cookie, Responder Cookie, and service card ID to form a complete mapping. The complete mapping identifies an ISAKMP channel.

A complete mapping is established after several ISAKMP packet exchanges. The first step is to save the mapping between the Initiator Cookie and the ID of the service card that initiates the ISAKMP packet. The mapping is the service card triggering mapping for the ISAKMP packet. This mapping is part of the whole mapping among the Initiator Cookie, Responder Cookie, and service card ID.

The method deletes the mapping between the Initiator Cookie and the service card when IKE negotiation fails, the IKE SA ages out, or a notification of deleting IKE SA is received.

At step 503, upon receiving an IKE response packet, the method extracts Initiator Cookie and Responder Cookie from the packet, finds the service card ID from the mapping that contains the Initiator Cookie, and sends the received IKE response packet to the service card.

Upon receiving an ISAKMP response, the method extracts the Initiator Cookie and Responder Cookie from the packet, finds the service card according to the Initiator Cookie (for example, use the first 6 bits of the cookie as the service card ID), and triggers the service card to perform IKE negotiation.

At step 504, the method adds the Responder Cookie to the Initiator Cookie-service card mapping to form a complete mapping.

The complete mapping shows the mapping among the Initiator Cookie, Responder Cookie, and the service card ID.

The following describes the IKE negotiation responding method of embodiment 2.

Figure 7:
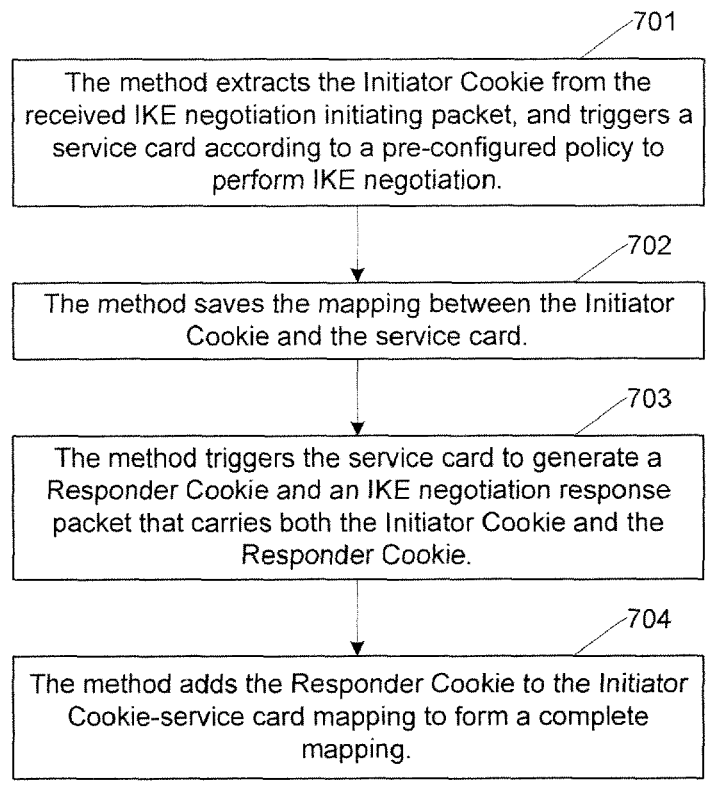
FIG. 7 is a flow chart of the IKE negotiation responding method of embodiment 2 of the present invention.

FIG. 7 is a flow chart of the IKE negotiation responding method of embodiment 2 of the present invention. As shown in FIG. 7, the procedure comprises the following steps:

At step 701, the method extracts the Initiator Cookie from the received IKE negotiation initiating packet, and triggers a service card according to a pre-configured policy to perform IKE negotiation.

Triggering a service card according to a pre-configured policy comprises: using the Hash algorithm to calculate the Initiator Cookie that is extracted from the received initiating packet, using the calculation result as the service card ID, and triggering the service card to perform IKE auto negotiation Other pre-configured policies can also be used in actual applications. For example, select an idle service card; or select a service card with higher processing capability; or select a service card in a preset order; or select a service card randomly.

At step 702, the method saves the mapping between the Initiator Cookie and the service card ID.

Because embodiment 2 of the present invention uses the Initiator Cookie and Responder Cookie fields to uniquely identify an ISAKMP channel, the method needs to save the Initiator Cookie-Responder Cookie-service card ID mappings.

After extracting the Initiator Cookie, the method first saves the mapping between the Initiator Cookie and the ID of the service card for the ISAKMP packet. The mapping is the service card triggering mapping for the ISAKMP packet. This mapping is part of the whole mapping among Initiator Cookie, Responder Cookie, and service card ID.

If the Initiator Cookie of the IKE negotiation initiating packet is not used as the triggering policy at step 701, the Initiator Cookie can be extracted at this step.

At step 703, the method triggers the service card to generate a Responder Cookie and an IKE negotiation response packet that carries both the Initiator Cookie and the Responder Cookie.

The service card can follow either of the methods at step 501 to generate a Responder Cookie. After generating the Responder Cookie, the service card generates an ISAKMP response packet whose header contains the Initiator Cookie and Responder Cookie, and sends this packet.

At step 704, the method adds the Responder Cookie to the Initiator Cookie-service card mapping to form a complete mapping.

The complete mapping shows the mapping among the Initiator Cookie, Responder Cookie, and the service card ID.

The following describes the IKE negotiation system of embodiment 2. The system comprises initiating apparatus 410 and responding apparatus 420.

Figure 8:
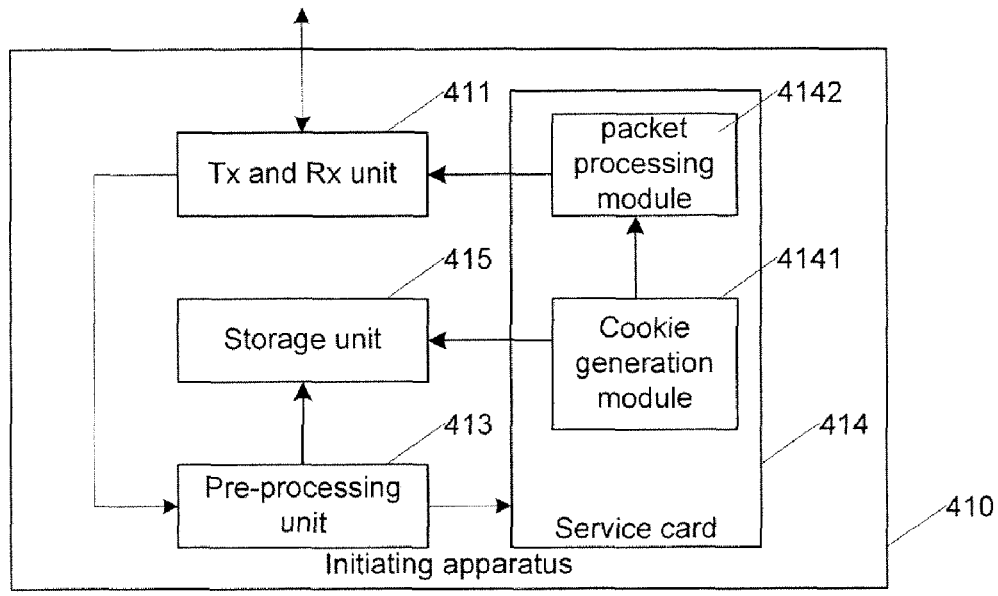
FIG. 8 is the block diagram of the IKE negotiation initiating apparatus of embodiment 2 of the present invention.

FIG. 8 is the block diagram of the IKE negotiation initiating apparatus of embodiment 2 of the present invention. As shown in FIG. 8, the initiating apparatus comprises transmitting and receiving unit 411, pre-processing unit 413, service card 414, and storage unit 415. As shown in FIG. 4, there can be one or more units for the same unit type.

1) Transmitting and receiving unit 411 receives data packets, sends IKE negotiation initiating packets, and receives IKE negotiation response packets.

2) Pre-processing unit 413 triggers service card 414 according to a pre-configured policy after the initiating apparatus receives a data packet, extracts the Initiator Cookie and Responder Cookie from the received IKE negotiation response packet, finds the service card ID from the mapping that contains the corresponding Initiator Cookie, and passes the received IKE negotiation packet to the proper service card.

3) Service card 414, after being triggered, generates the Initiator Cookie, generates an IKE negotiation initiating packet that carries the Initiator Cookie, and sends this packet to transmitting and receiving unit 411; service card 414 performs IKE negotiation according to a received IKE negotiation response packet.

Service card 414 comprises Cookie generation module 4141 and packet processing module 4142. Wherein, ①Cookie generation module 4141 is triggered to generate an Initiator Cookie.

②packet process module 4142 generates an IKE negotiation initiating packet that carries the Initiator Cookie, and sends this packet to transmitting and receiving unit 411; process module 4142 performs IKE negotiation according to a received IKE negotiation response packet.

4) Storage unit 415 saves the mapping between the Initiator Cookie and the service card ID; storage unit 415 adds the Responder Cookie to the Initiator Cookie-service card ID mapping to form a complete mapping.

Storage unit 415 can be integrated into pre-processing unit 413. There can be one or more service cards 414.

The following describes the IKE negotiation responding apparatus of embodiment 2.

Figure 9:
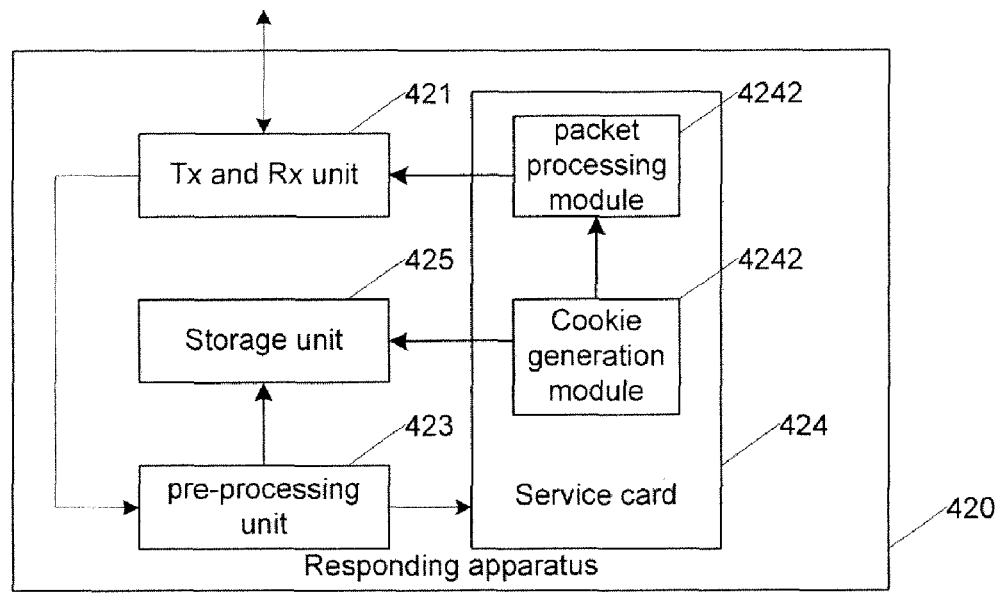
FIG. 9 is the block diagram of the IKE negotiation responding apparatus of embodiment 2 of the present invention.

FIG. 9 is the block diagram of the IKE negotiation responding apparatus of embodiment 2 of the present invention. As shown in FIG. 9, the responding apparatus comprises transmitting and receiving unit 421, pre-processing unit 423, service card 424, and storage unit 425. As shown in FIG. 4, there can be one or more units for the same unit type.

1) Transmitting and receiving unit 421 receives IKE negotiation initiating packets and sends IKE negotiation response packets.

2) Pre-processing unit 423 extracts the Initiator Cookie from the received IKE negotiation initiating packet, and triggers service card 424 according to a pre-configured policy to perform IKE negotiation.

3) Service card 424, after being triggered, generates a Responder Cookie, generates an IKE negotiation response packet that carries the Initiator Cookie and the Responder Cookie, and sends this response packet to transmitting and receiving unit 421.

Service card 424 comprises Cookie generation module 4241 and packet processing module 4242. Wherein, ①Cookie generation module 4241, after being triggered, generates a Responder Cookie.

②packet processing module 4142 generates an IKE negotiation response packet that carries the Initiator Cookie and Responder Cookie, and sends the packet to the transmitting and receiving unit 411.

4) Storage unit 425 saves the mapping between the Initiator Cookie and the service card ID, and after service card 424 generates a Responder Cookie, adds this Responder Cookie to the Initiator Cookie-service card ID mapping to form a complete mapping.

Storage unit 425 can be integrated in to pre-processing unit 423. There can be one or more service cards 424.

Obviously, the IKE negotiation methods and apparatuses can exist independently or coexist in a device like a network node.

The method, apparatus, and system for IKE negotiation provided by embodiment 2 of the present invention, upon receiving a data packet, trigger a service card according to a pre-configured policy to generate an Initiator Cookie, trigger the service card to generate an IKE negotiation packet that carries the Initiator Cookie, send out the packet, and then save the mapping between the Initiator Cookie and the service card ID; upon receiving a response packet, extract the Initiator Cookie and Responder Cookie from the response packet, find the service card from the mapping that contains the Initiator Cookie, and send the response packet to the service card; finally, add the Responder Cookie to the Initiator Cookie-service card ID mapping to form a complete mapping. Embodiment 2 of the present invention distributes IKE negotiation tasks to different service cards, thus improving IKE negotiation speed.

Embodiment 3

The following details the IKE negotiation method by describing how the sending node and receiving node negotiate an IKE ISAKMP channel. The technical personnel of this field should recognize that this example only illustrates the present invention, but does not limit the scope of the present invention. The sending node and receiving node can be routers or Layer 3 switches.

Figure 10:
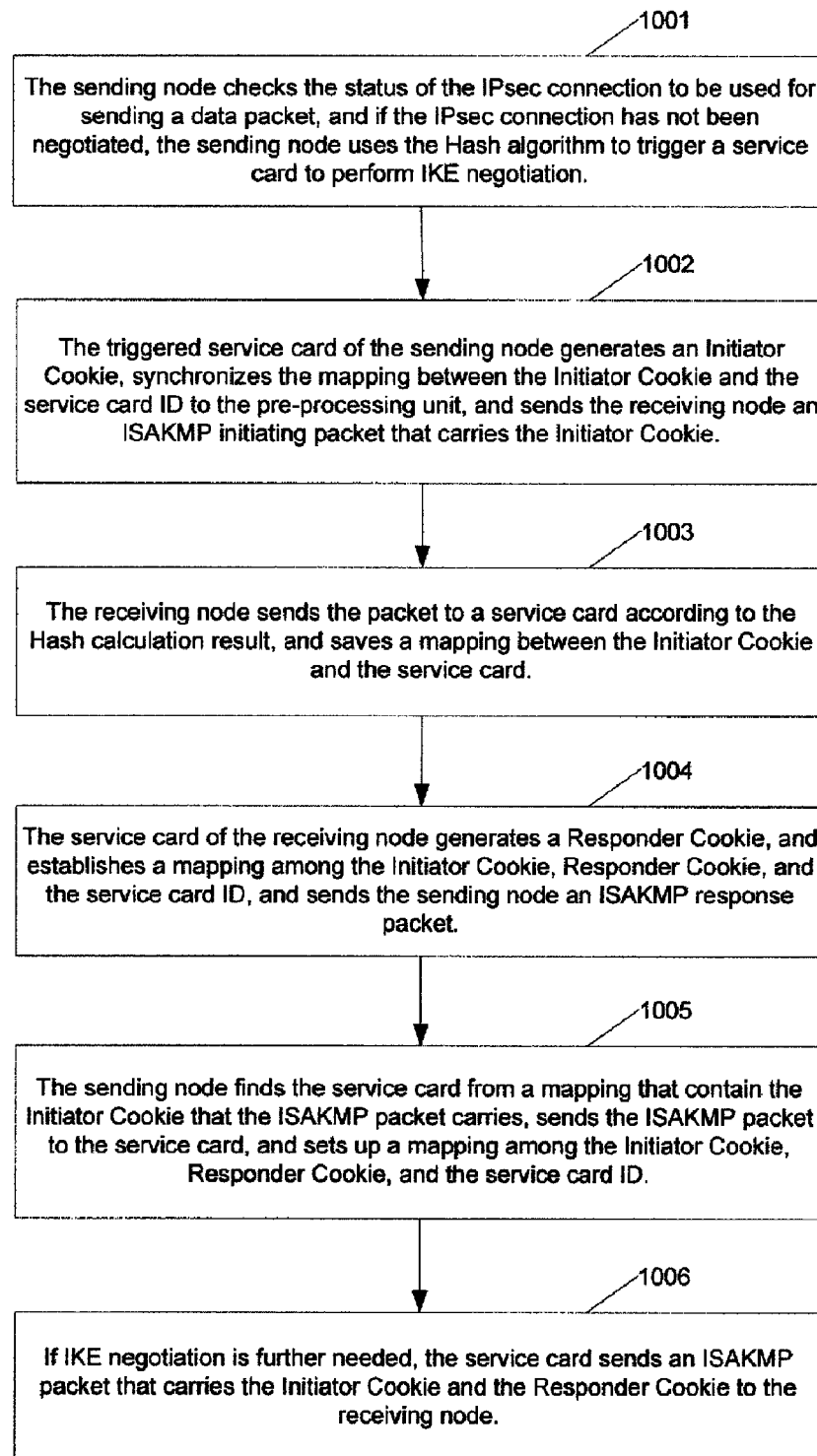
FIG. 10 is a flow chart of the IKE negotiation initiating method of embodiment 3 of the present invention.

FIG. 10 is a flow chart of the IKE negotiation initiating method of embodiment 3 of the present invention. As shown in FIG. 10, the method comprises the following steps:

Before all steps, an IKE distribution table should be set on the sending node and receiving node. This table saves the service card triggering mappings for IKE negotiation packets, that is, the mappings between IKE negotiation packets and service cards. In practice, technical personnel of this field should recognize that other methods can be used to save the service card triggering mappings. In addition, all service cards should have the IKE-related configurations, such as the authentication method, encryption algorithm, DH group, and SA lifetime of the IKE proposal. The configurations can be synchronized by using the existing technology.

At step 1001, the sending node checks the status of the IPsec connection to be used for sending a data packet. If the IPsec connection has not been negotiated, the sending node uses the Hash algorithm to trigger a service card to perform IKE negotiation.

The triggering operation is implemented by the pre-processing unit of the sending node. The pre-processing unit sends received packets to corresponding service cards. After the pre-processing unit receives a packet, it first checks the status of the IPsec connection to be used for sending the packet.

1) If the IPsec connection is being negotiated, the pre-processing unit does not process the packet, and the procedure ends.

2) If the IPsec connection is up, the pre-processing unit sends the packet by using the existing technology, and then the procedure ends.

For example, the data packet can be sent by the service card where the IPsec connection is set up or by any service card. To enable any service card to send a data packet, it is required to synchronize IKE SA data among service cards. The IKE SA data includes the encryption key, authentication key, and encryption and authentication algorithms.

3) If the IPsec connection has not been negotiated, the pre-processing unit uses the Hash algorithm to trigger the service card of the sending node to start IKE negotiation and executes step 1002.

At this step, because the IPsec connection has not been set up, The method triggers the service card of the sending node to perform IKE negotiation. The packet to be sent contains the address of the receiving node. If the IPsec connection has not been negotiated between the sending node and the receiving node, the IKE distribution table does not contain the mapping between the IPsec connection and the service card. Therefore, the pre-processing unit uses the Hash algorithm to trigger a service card.

At step 1002, the triggered service card of the sending node generates the Initiator Cookie, synchronizes the mapping between the Initiator Cookie and the service card ID to the pre-processing unit, and sends the receiving node an ISAKMP initiating packet that carries the Initiator Cookie.

At this step, to make the service card implement IKE negotiation, an IKE negotiation module needs to be added to expand the service card function. The IKE negotiation module is configured with IKE policies that comprise the authentication method, encryption algorithm, DH group, and SA lifetime.

The method uses the random number that is generated by service card as the Initiator Cookie. For example, the random 32-bit value generated by using the existing technique can be used as an Initiator Cookie.

Then the method saves a mapping between the Initiator Cookie and the service card ID to the IKE distribution table to form a partial mapping. This mapping entry is not complete because the service card triggering mapping for the IPsec connection only maps the Initiator Cookie to the service card ID. The IKE distribution table can be saved in the pre-processing unit or a dedicated storage unit. The service card sends the mapping to the pre-processing unit that saves the mapping to the IKE distribution table. The service card triggering mapping is:

TABLE 1

| Initiator Cookie | Null | ID of the service card of the sending node |
|---|---|---|

The mapping between the Initiator Cookie and the service card is removed from the IKE distribution table when IKE negotiation fails, IKE SA ages out, or a notification of deleting IKE SA is received.

Finally, the service card of the sending node sends the receiving node the ISAKMP initiating packet that carries the Initiator Cookie.

At step 1003, upon receiving the ISAKMP packet, the receiving node checks if there is a service card triggering mapping for the ISAKMP packet. If not, the receiving node sends the packet to a service card according to the Hash calculation result, and saves in the IKE distribution table a mapping between the Initiator Cookie and the ID of the selected service card.

More specifically, after the receiving node receives the ISAKMP packet, the method first checks the content of the packet. If the ISAKMP packet carries only the Initiator Cookie, the method considers the packet an ISAKMP initiating packet; if the packet carries both the Initiator Cookie and the Responder Cookie, the method considers the packet an ISAKMP response packet.

1) If the packet carries both Initiator Cookie and the Responder Cookie, the method further checks if there is a mapping among the Initiator Cookie, Responder Cookie, and the service card ID in the IKE distribution table.

① If yes, the method checks if there is a complete service card triggering mapping for this IKE negotiation packet. If IKE negotiation is needed, the method triggers a service card to perform IKE negotiation, and the procedure ends.

If the method finds a service card from a mapping that contains the Initiator Cookie and the Responder Cookie in the ISAKMP packet, the method considers a complete service card triggering mapping exists for the IKE negotiation packet. Then, the method considers the IKE negotiation successful and triggers the service card to perform IKE negotiation.

② If no, the method checks if a mapping between the Initiator Cookie and the service card exists. If yes, the method considers a partial service card triggering mapping exists for the IKE negotiation packet; if no, the procedure ends.

Because the method cannot find an entry that contains the Initiator Cookie and Responder Cookie in the ISAKMP response packet in the IKE distribution table, the method searches the table for a mapping that contains the Initiator Cookie.

i. If a match is found, the method considers a partial service card triggering mapping exists for the IKE negotiation packet, and considers the node the sending node. Go to step 1005 for the subsequent procedures.

ii. If no match is found, the method considers an IKE negotiation error occurred. The whole negotiation procedure ends, or the method requests the peer to send an IKE negotiation message again, and executes the procedure above.

2) If the ISAKMP packet carries only the Initiator Cookie, the method considers no service card triggering mapping exists for the IKE negotiation packet, and considers the node the receiving node. The method then sends the ISAKMP packet to the service card based on the Hash algorithm, and sets up a mapping between the Initiator Cookie and the service card in the IKE distribution table.

At this step, the triggering operation can be done by the pre-processing unit of the receiving node. After the pre-processing unit receives the ISAKMP packet, because no mapping is set up between the ISAKMP channel and a service card, the receiving node uses the Hash algorithm to select a service card and triggers the card to perform IKE negotiation. In addition, the method forms a partial mapping by using the Initiator Cookie in the ISAKMP packet and the service card ID. The partial service card triggering mapping is:

TABLE 2

| Initiator Cookie | Null | ID of the service card of the receiving node |
|---|---|---|

At step 1004, the service card of the receiving node generates a Responder Cookie, and establishes a mapping among the Initiator Cookie, Responder Cookie, and the service card ID, synchronizes the mapping to the pre-processing unit, and sends the sending node an ISAKMP response packet that carries the Initiator Cookie and the Responder Cookie.

At this step, the method to generate a Responder Cookie can follow either of the methods at step 1002. After the Responder Cookie is generated, the method adds this Responder Cookie to the mapping that is generated at step 1003 to form a complete mapping between the Initiator Cookie, the Responder Cookie, and the service card ID in the IKE distribution table. The complete service card triggering mapping is:

TABLE 3

| Initiator Cookie | Responder Cookie | ID of the service card of the receiving node |
| --- | --- | --- |

Finally, the service card of the receiving node sends the sending node the ISAKMP response packet that carries both the Initiator Cookie and the Responder Cookie.

At step 1005, after the sending node receives the ISAKMP packet, the method checks if a partial service card triggering mapping exists for this packet. If yes, the method finds the service card that maps to the Initiator Cookie that is carried in the ISAKMP packet, sends ISAKMP packet to the service card, and sets up a mapping among the Initiator Cookie, Responder Cookie, and the service card ID.

More specifically, after the sending node receives the ISAKMP packet, the method first checks the content of the received ISAKMP packet.

1) If the ISAKMP packet carries only the Initiator Cookie, the method determines no service card triggering mapping exists for this packet, and considers the node the receiving node. Go to step 1003 for the subsequent procedures.

2) If the packet carries both the Initiator Cookie and the Responder Cookie, the method further checks if there is a mapping among the Initiator Cookie, Responder Cookie, and the service card in the IKE distribution table.

① If yes, the method considers a complete service card triggering mapping exists for the IKE negotiation, and if IKE negotiation is needed, the method triggers a service card to perform IKE negotiation, and the procedure ends.

② If no, the method checks if the IKE distribution table has a mapping between the Initiator Cookie and the service card. If yes, the node considers a partial service card triggering mapping exists for the IKE negotiation packet; if no, the procedure ends.

i. If still no entry that contains the Initiator Cookie is found, the method considers an IKE negotiation error occurred, and the whole negotiation procedure ends, or the method requests the peer to send an IKE negotiation message again, and executes the procedure above.

ii. If an entry that contains the Initiator Cookie is found in the IKE distribution table, the method considers a partial service card triggering mapping exists for this IKE negotiation packet, and considers the node the sending node, finds the service card from the entry that contain the Initiator Cookie, sends the packet to the service card, and establishes a mapping among the Initiator Cookie, Responder Cookie, and service card ID.

At this step, the pre-processing unit of the sending node searches the IKE distribution table according to the Initiator Cookie. If an entry that contains the Initiator Cookie and the service card is found, the pre-processing unit triggers the target service card to perform IKE negotiation. At the same time, the pre-processing unit adds the Responder Cookie to the IKE distribution table to form a complete entry, that is, the mapping among the Initiator Cookie, Responder Cookie, and the service card ID. The complete service card triggering mapping is:

TABLE 4

| Initiator Cookie | Responder Cookie | ID of the service card of the sending node |
| --- | --- | --- |

Then, the first phase of IKE auto negotiation is complete.

At step 1006, if IKE negotiation is further needed, the service card sends an ISAKMP packet that carries the Initiator Cookie and the Responder Cookie to the receiving node.

In the following procedure, the sending node or receiving node, upon receiving a packet from the peer, directly locates the service card according to the mapping in the IKE distribution table, and triggers the service card to perform IKE negotiation.

In actual applications, it may be required to upgrade from the existing technology that uses one IKE negation main board to the present invention that uses multiple service cards to perform IKE negotiation. Before upgrading, record the mapping between the ID of the main board that is triggered to perform IKE negotiation and the IKE negotiation packet. Then insert more service cards as needed and complete the upgrade.

Figure 11:
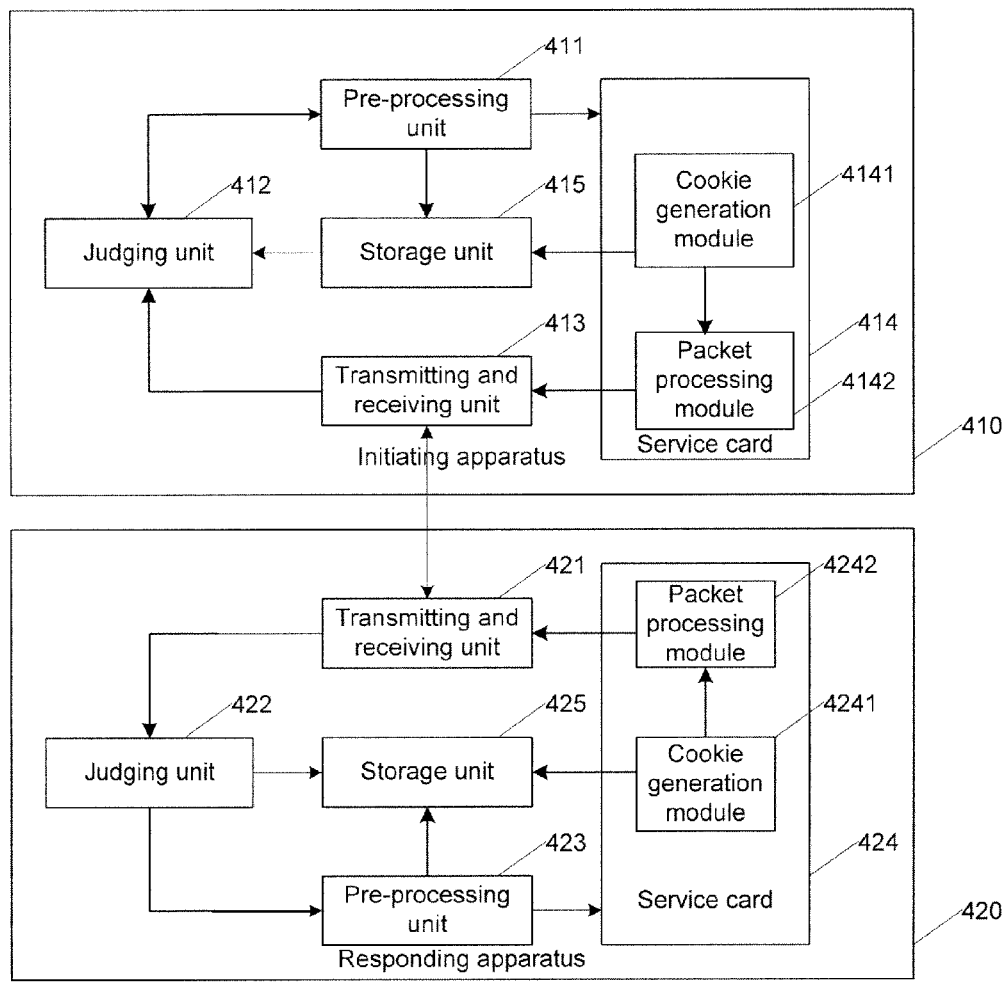
FIG. 11 is the block diagram of the IKE negotiation system of embodiment 3 of the present invention.

The following describes the IKE negotiation system of the embodiment 3. FIG. 11 is block diagram of the IKE negotiation system according to embodiment 3 of the present invention. As shown in FIG. 11, the system comprises initiating apparatus 410 and responding apparatus 420. Initiating apparatus 410 is the sending node and the responding apparatus 420 is the receiving node.

1. Initiating apparatus comprises transmitting and receiving unit 411, judging unit 412, pre-processing unit 413, service card 414, and storage unit 415. There can be one or more units for the same unit type.

1) Transmitting and receiving unit 411 receives data packets, and sends the packet that is processed according to the established IPsec connection or sends IKE negotiation initiating packets; receives IKE negotiation packets.

2) Judging unit 412 checks the IPsec connection status that corresponds to the data packet received by transmitting and receiving unit 411. If the IPsec connection is set up, pre-processing unit 413 is triggered to process the packet according to this connection. If the connection has is being negotiated, the system triggers no operation. If IPsec connection has not been negotiated, pre-processing unit 413 triggers service card 414 according to a pre-configured policy; pre-processing unit 413 obtains the Initiator Cookie from the IKE negotiation packet, and checks if storage unit 415 has a mapping between the Initiator Cookie and service card 414. If yes, pre-processing unit 413 considers a partial service card triggering mapping exists for the received IKE negotiation packet. If no, the system performs no operation.

3) Pre-processing unit 413 processes the received packet according to the negotiated IPsec connection or triggers service card 414 according to a pre-configured policy; pre-processing unit 413 obtains the Initiator Cookie and the Responder Cookie from the received IKE negotiation packet, after judging unit 412 considers a partial service card trigger mapping exists for the IKE negotiation packet, finds the service card ID that maps to the Initiator Cookie, sends the IKE negotiation packet to the service card, and provides the Responder Cookie to storage unit 415.

In practice, judging unit 412 can obtain the Initiator Cookie and the Responder Cookie from the received IKE negotiation packet.

4) Service card 414 generates an Initiator Cookie after being triggered, provides the mapping between the Initiator Cookie and the service card ID to storage unit 415, generates an IKE negotiation initiating packet that carries the Initiator Cookie, sends the packet to transmitting and receiving unit 411; service card 414 performs IKE negotiation according to the received IKE negotiation packet.

Service card 414 comprises Cookie generation module 4141 and packet processing module 4142. Wherein, ① Cookie generation module 4141, after being triggered, generates an Initiator Cookie, and provides the mapping between the Initiator Cookie and the service card ID to storage unit 415.

② packet processing module 4142 generates an IKE negotiation initiating packet that carries the Initiator Cookie, sends the packet to transmitting and receiving unit 411; performs IKE negotiation after receiving an IKE negotiation packet.

5) Storage unit 415, after service card 414 generates the Initiator Cookie, saves the mapping between the Initiator Cookie and the service card ID; storage unit 415 adds the Responder Cookie that is obtained from the IKE negotiation packet to the Initiator Cookie-service card ID mapping to form a complete mapping.

Judging unit 412 and storage unit 415 can be integrated into pre-processing unit 413. The number of pre-processing units 413 is determined by the number of interfaces of the network node (for example, the number of interfaces of the router); the number of service cards depends on the IKE negotiation processing requirements.

Preferably, before checking if storage unit 415 has a mapping between the Initiator Cookie and service card 414, judging unit 412 receives the Responder Cookie that is obtained from the IKE negotiation packet by pre-processing unit 413, and checks the type of the IKE negotiation packet. If the IKE negotiation packet carries both Initiator Cookie and Responder Cookie, judging unit 412 determines the IKE negotiation packet is an IKE negotiation response packet, and then continues to check if storage unit 415 has a mapping between the Initiator Cookie and service card 414.

More preferably, after determining the IKE negotiation packet is an IKE negotiation response packet, judging unit 412 can check if storage unit 415 has a mapping among the Initiator Cookie, Responder Cookie, and ID of service card 414. If yes, judging unit 412 considers a complete service card triggering mapping exists for the IKE negotiation packet. If not, judging unit 412 continues to check if the storage unit 415 has a mapping between the Initiator Cookie and service card 414.

After judging unit 412 finds that a complete service card triggering mapping exists for the IKE negotiation packet, pre-processing unit 413 finds the service card from the mapping that contains the Initiator Cookie and Responder Cookie, and sends the IKE negotiation packet to service card 414.

2. Responding apparatus comprises transmitting and receiving unit 421, judging unit 422, pre-processing unit 423, service card 424, and storage unit 425. There can be one or more units for the same unit type.

1) Transmitting and receiving unit 421 receives IKE negotiation initiating packets, and sends IKE negotiation response packets.

2) Judging unit 422 receives the Initiator Cookie and the Responder Cookie that pre-processing unit 423 obtains from the IKE negotiation packet, checks the content of the packet. If only the Initiator Cookie is carried in the packet, judging unit 422 concludes that no service card triggering mapping exists for the IKE negotiation packet.

Because the IKE negotiation packet carries only the Initiator Cookie, judging unit 422 also concludes that the packet is an IKE negotiation initiating packet.

3) Pre-processing unit 423 obtains the Initiator Cookie and Responder Cookie from the IKE negotiation packet that transmitting and receiving unit 421 receives. After judging unit 422 finds no service card triggering mapping exists for the IKE negotiation packet, pre-processing unit 423 triggers service card 424 according to a pre-configured policy, and sends the mapping between the Initiator Cookie and the ID of service card 424 to storage unit 415.

In practice, judging unit 422 can obtain the Initiator Cookie and Responder Cookie from the received IKE negotiation packet.

4) Service card 424, after being triggered, generates a Responder Cookie, provides the cookie to storage unit 425, generate an IKE negotiation response packet that carries the Initiator Cookie and the Responder Cookie, and then sends the IKE negotiation response packet to transmitting and receiving unit 421.

Service card 424 comprises Cookie generation module 4241 and packet processing module 4242. Wherein, ① Cookie generation module 4241, after being triggered, generates a Responder Cookie, and provides the Cookie to storage unit 425.

② packet processing module 4242 generates an IKE negotiation response packet that carries both the Initiator Cookie and Responder Cookie, and sends this packet to transmitting and receiving unit 421.

5) Storage unit 425 saves the mapping between the Initiator Cookie that is obtained from the IKE negotiation packet and the service card ID; adds the Responder Cookie to mapping between the Initiator Cookie and service card ID to form a complete mapping.

Judging unit 422 and storage unit 425 can be integrated into pre-processing unit 423. The number of pre-processing units 423 is determined by the number of interfaces of the network node (for example, the number of interfaces of the router); the number of service cards 424 depends on the IKE negotiation processing requirements.

The IKE negotiation initiating apparatus and responding apparatus of embodiment 3 can be two independent apparatuses that form the IKE negotiation system, or they can coexist in one device. The device comprises initiating apparatus 410 and responding apparatus 420. The IKE device can be either a sending node or a receiving node depending on how it processes IKE negotiation packets. If the IKE device receives an IKE negotiation response packet after sending an IKE negotiation initiating packet to the peer device, the IKE device is the sending node. If the IKE device sends an IKE negotiation response packet to the peer after receiving an IKE initiating packet, the IKE device is the receiving node.

Embodiment 4

Embodiment 4 of this invention is based on embodiment 1, and describes another method and apparatus for IKE negotiation.

Embodiment 2 uses the random value that the service card generates as the Initiator Cookie or Responder Cookie. If embodiment 2 uses the service card ID and a random value to generate the Initiator Cookie and the Responder Cookie, another procedure applies.

Embodiment 2 uses the service card ID and a random value to generate the Initiator Cookie or Responder Cookie. The IKE negotiation initiating apparatus or responding apparatus saves only the Initiator Cookie or Responder Cookie generated by itself. After receiving an ISAKMP packet that carries the Initiator Cookie and Responder Cookie, the IKE negotiation initiating apparatus or responding apparatus uses the cookie contained in its IKE distribution table to obtain the service card ID, and triggers the service card to perform IKE negotiation.

First, the following describes the method for initiating IKE negotiation.

Figure 12:
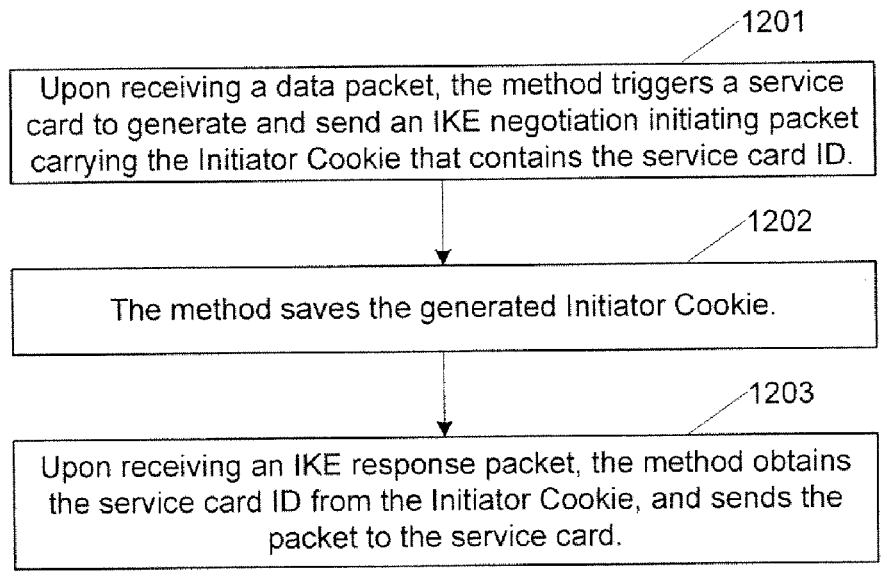
FIG. 12 is a flow chart of the IKE negotiation initiating method of embodiment 4 of the present invention.

FIG. 12 is a flow chart of the IKE negotiation initiating method of embodiment 4 of the present invention. The method comprises the following steps:

At step 1201, upon receiving a data packet, the method triggers a service card according to a pre-configured policy to generate an Initiator Cookie, and triggers the service card to generate and send an IKE negotiation initiating packet that carries the Initiator Cookie.

As shown in FIG. 6, the service card follows the second method, which uses the service card ID and a random value to generate the Initiator Cookie. For example, in an Initiator Cookie, the first 6 bits represent the service card ID, and the rest 26 bits represent a random value.

At step 1202, the method saves the generated Initiator Cookie.

The service card triggering mapping contains the Initiator Cookie that contains the ID of the service card.

At step 1203, upon receiving an IKE response packet, the method obtains the Initiator Cookie from the packet, obtains the service card ID from the Initiator Cookie, and sends the packet to the service card.

Upon receiving an ISAKMP response, the method extracts the Initiator Cookie and Responder Cookie from the packet, finds the service card according to the Initiator Cookie (for example, use the first 6 bits of the cookie as the service card ID), and triggers the service card to perform IKE negotiation.

The following describes the IKE negotiation responding method of embodiment 4.

Figure 13:
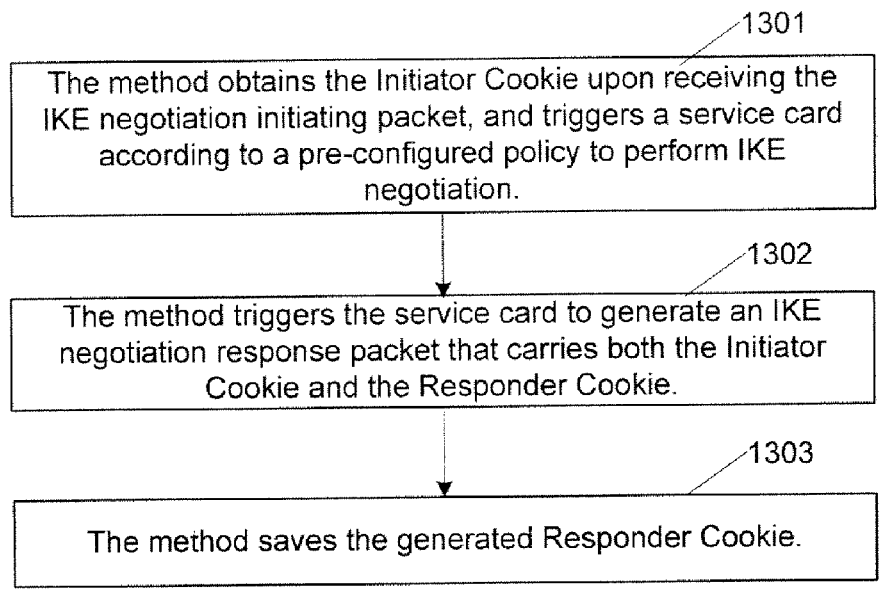
FIG. 13 is a flow chart of the IKE negotiation responding method of embodiment 4 of the present invention.

FIG. 13 is a flow chart of the IKE negotiation responding method of embodiment 4 of the present invention. As shown in FIG. 13, the procedure comprises these steps:

At step 1301, the method obtains the Initiator Cookie upon receiving the IKE negotiation initiating packet, and triggers a service card according to a pre-configured policy to perform IKE negotiation.

At step 1302, the method triggers the service card to generate a Responder Cookie and an IKE negotiation response packet that carries both the Initiator Cookie and the Responder Cookie.

The service card can follow either of the methods at step 1301 to generate a Responder Cookie. Then the service card generates an ISAKMP response packet whose header contains the Initiator Cookie and Responder Cookie, and sends this packet.

At step 1303, the method saves the generated Responder Cookie.

Then the service card triggering mapping saves the Responder Cookie that contains the ID of the service card.

The following describes the IKE negotiation system of embodiment 4. The system comprises initiating apparatus 410 and responding apparatus 420. As shown in FIG. 8, the initiating apparatus comprises transmitting and receiving unit 411, pre-processing unit 413, service card 414, and storage unit 415. There can be one or more units for the same unit type.

1) Transmitting and receiving unit 411 receives data packets, sends IKE negotiation initiating packets; receives IKE negotiation response packets.

2) Pre-processing unit 413, upon receiving a data packet, triggers service card 414 according to a pre-configured policy; obtains the Initiator Cookie upon receiving an IKE negotiation response packet, obtains the service card ID from the Initiator Cookie, and passes the received IKE negotiation response packet to the corresponding service card.

3) Service card 414, after being triggered, generates an Initiator Cookie, generates an IKE negotiation initiating packet that carries the Initiator Cookie, and sends the packet to transmitting and receiving unit 411; perform IKE negotiation according to the received IKE negotiation response packet.

Service card 414 comprises Cookie generation module 4141 and packet processing module 4142. Wherein, ① Cookie generation module 4141, after being triggered, generates the Initiator Cookie that contains the service card ID.

① packet processing module 4142 generates an IKE negotiation initiating packet that carries the Initiator Cookie, and sends the packet to transmitting and receiving unit 411; performs IKE negotiation according to the received IKE negotiation response packet.

4) Storage unit 415 saves the Initiator Cookie that is generated by service card 414.

Storage unit 415 can be integrated into pre-processing unit 413. There can be one or more service cards 414.

As shown in FIG. 9, the responding apparatus comprises transmitting and receiving unit 421, pre-processing unit 423, service card 424, and storage unit 425. There can be one or more units for the same unit type.

1) Transmitting and receiving unit 421 receives IKE negotiation initiating packets and sends IKE negotiation response packets.

2) Pre-processing unit 423 extracts the Initiator Cookie from the received IKE negotiation initiating packet, and triggers service card 424 according to a pre-configured policy to perform IKE negotiation.

3) Service card 424, after being triggered, generates a Responder Cookie, generates an IKE negotiation response packet that carries both the Initiator Cookie and the Responder Cookie, and sends the packet to transmitting and receiving unit 421.

Service card 424 comprises Cookie generation module 4241 and packet processing module 4242. Wherein, ① Cookie generation module 4241, after being triggered, generates the Responder Cookie that contains the service card ID.

② packet processing module 4242 generates an IKE negotiation response packet that carries both the Initiator Cookie and Responder Cookie, and sends the packet to transmitting and receiving unit 421.

Storage unit 425 saves the Responder Cookie that is generated by service card 424.

Storage unit 425 can be integrated in to the pre-processing unit 423. There can be one or more service cards 424.

Obviously, the IKE negotiation methods and apparatuses can exist independently or coexist in a device like a network node.

The IKE negotiation method, apparatus, and system provided by embodiment 4 of the present invention trigger a service card according to a pre-configured policy to generate an Initiator Cookie that contains the ID of the service card, and trigger the service card to generate and send an IKE negotiation initiating packet that carries the Initiator Cookie; save the Initiator Cookie; upon receiving an IKE negotiation response packet, embodiment 4 extracts the Initiator Cookie from the packet, obtains the service card ID from the Initiator Cookie, and sends the IKE negotiation response packet to the service card to perform IKE negotiation. IKE negotiation tasks are distributed to different service cards, thus improving IKE negotiation speed.

Embodiment 5

The following details the IKE negotiation methods by describing how the sending node and receiving node negotiate IKE ISAKMP SA. The technical personnel of this field should recognize that this example only illustrates the present invention, but does not limit the scope of the present invention. The sending node and receiving node can be routers or Layer 3 switches.

Figure 14:
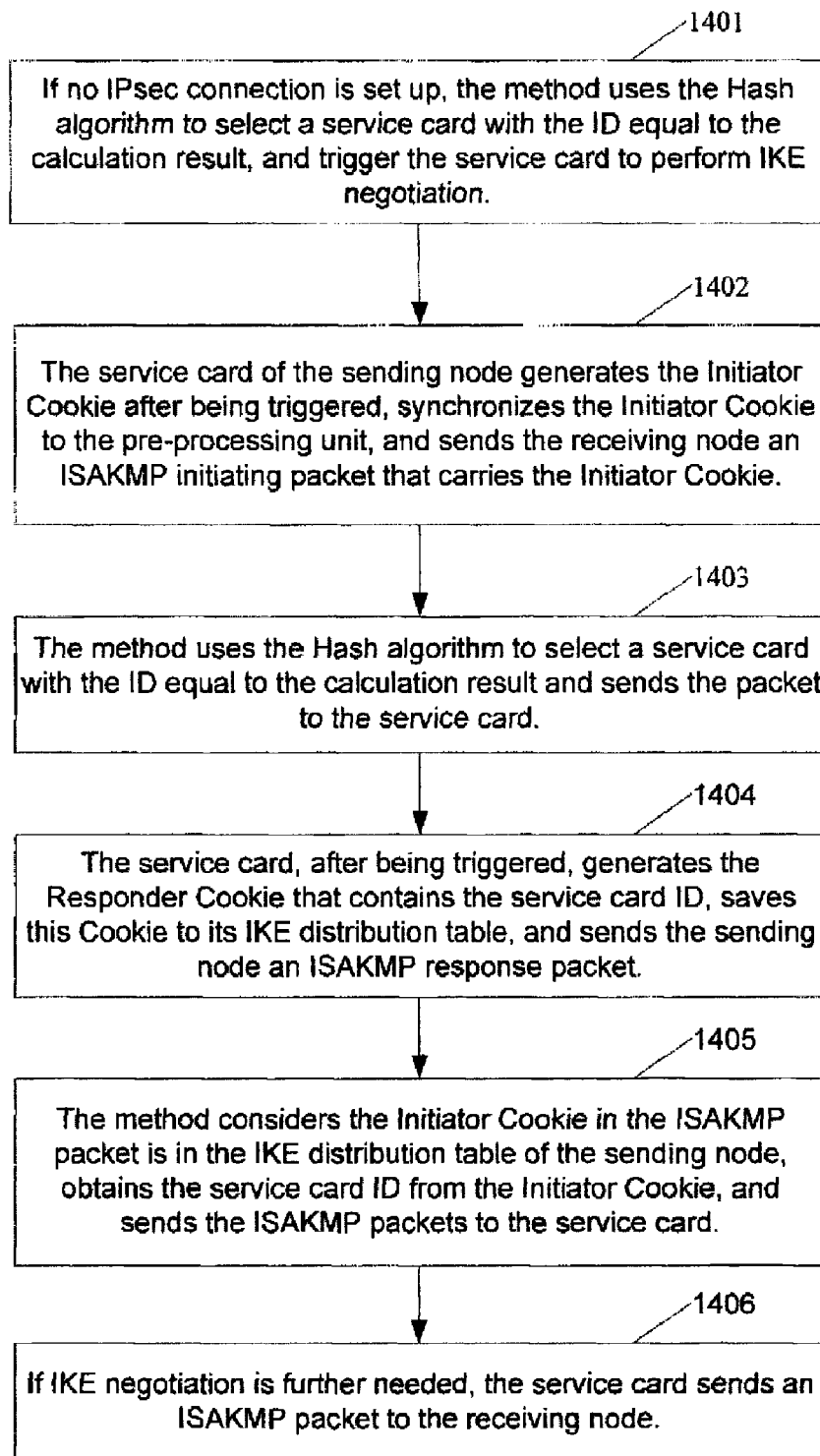
FIG. 14 is a flow chart of the IKE negotiation initiating method of embodiment 5 of the present invention.

FIG. 14 is a flow chart of the IKE negotiation method of embodiment 5 of the present invention. As shown in FIG. 14, the method comprises the following steps:

Before all steps, an IKE distribution table should be set on each sending node and receiving node. This table saves service card triggering mappings for IKE negotiation packets. The mappings map IKE negotiation packets to service cards. In practice, technical personnel of this field should recognize that other methods can be used to save the service card triggering mappings for IKE negotiation packets. In addition, all service cards should have the IKE-related configurations, such as the authentication method, encryption algorithm, DH group, and SA lifetime of the IKE proposal. The configurations can be synchronized by using the existing technology.

At step 1401, the method checks the status of the IPsec connection to be used for sending a data packet. If no IPsec connection is set up, the method uses the Hash algorithm to select a service card with the ID equal to the calculation result, and trigger the service card to perform IKE negotiation.

For details, see step 1001.

At step 1402, the service card of the sending node generates the Initiator Cookie after being triggered, synchronizes the Initiator Cookie to the pre-processing unit, and sends the receiving node an ISAKMP initiating packet that carries the Initiator Cookie.

The method uses a random value generated by the service card to generate the Initiator Cookie. For example, the method uses the service card ID and a random value to generate an Initiator Cookie. For example the service card ID takes the first 6 bits and a random value takes the rest 26 bits.

The IKE distribution table saves the Initiator Cookie.

At step 1403, the method, after the receiving node receives the ISAKMP packet, checks if there is a service card triggering mapping for the ISAKMP packet. If no, the method uses the Hash algorithm to select a service card with the ID equal to the calculation result and sends the packet to the service card.

More specifically, upon receiving the ISAKMP packet, the method first checks the content of the packet. If the ISAKMP packet carries only the Initiator Cookie, the method determines the packet is an ISAKMP initiating packet; if the packet carries both the Initiator Cookie and the Responder Cookie, the method determines the packet is an ISAKMP response packet.

1) If the ISAKMP packet carries both the Initiator Cookie and Responder Cookie, the method checks if the IKE distribution table has an entry that contain the Initiator Cookie.

① If yes, the method considers a service card triggering mapping exists for the IKE negotiation packet, and considers the node the sending node. Then the method considers the IKE negotiation successful and triggers the service card to perform IKE negotiation.

② If no, the method checks if the IKE distribution table has an entry that contains the Responder Cookie. If a match is found, the method considers a service card triggering mapping exists for the IKE negotiation packet, and considers the node the sending node. If no match is found, the procedure ends.

If no entry that contains the Initiator Cookie is found in the IKE distribution table, the method checks if the IKE distribution table has an entry that contains the Responder Cookie.

i. If an entry that contains the Responder Cookie is found, the method considers a service card triggering mapping for the IKE negotiation packet exists, and considers the node the receiving node. Then, the method considers IKE negotiation successful and triggers the service card to perform IKE negotiation.

ii. If no entry that contains the Initiator Cookie is found, the method considers an IKE negotiation error occurred, the whole negotiation procedure ends, or the method requests the peer to send an IKE negotiation packet again, and executes the procedure above.

2) If the ISAKMP packet carries only the Initiator Cookie, the method concludes no service card triggering mapping exists for the IKE negotiation packet, and considers the node the receiving node. Then the method uses the Hash algorithm, selects the service card with the ID equal to the Hash calculation result, and passes the packet to the selected service card.

At this step, because the ISAKMP packet carries only the Initiator Cookie, the method considers that no service card triggering mapping exists for the IKE negotiation. Furthermore, the method checks if the IKE distribution table has an entry that contains the Initiator Cookie. At this step, no entry is found; therefore, the pre-processing unit selects a service card with the ID equal to the Hash calculation result.

In actual application, the method can first check if the IKE distribution table has an entry that contains the Responder Cookie, then if an entry that contains the Initiator Cookie.

At step 1404, the service card, after being triggered, generates the Responder Cookie that contains the service card ID, saves this Cookie to its IKE distribution table, and sends the sending node an ISAKMP response packet that carries both the Initiator Cookie and Responder Cookie.

This step uses the method for generating the Initiator Cookie described at step 1402.

At step 1405, upon receiving the ISAKMP response packet, the method checks if the Initiator Cookie in the ISAKMP packet is in the IKE distribution table of the sending node. If yes, the method obtains the service card ID from the Initiator Cookie, and sends the ISAKMP packets to the service card.

More specifically, upon receiving the ISAKMP packet, the method first checks the content of the packet that the sending node receives. If the ISAKMP packet carries only the Initiator Cookie, method considers the packet the ISAKMP initiating packet; if the packet carries both the Initiator Cookie and the Responder Cookie, the method considers the packet the ISAKMP response packet.

1) If the ISAKMP packet carries only the Initiator Cookie, the method considers no service card triggering mapping exists for the IKE negotiation packet, and considers the node the receiving node. Then the method uses the Hash algorithm, selects a service card with the ID equal to the calculation result, and passes the packet to the service card.

2) If the ISAKMP packet carries both the Initiator Cookie and Responder Cookie, the method checks if the IKE distribution table has an entry that contains the Initiator Cookie.

① If no, the method checks if the table has an entry that contains the Responder Cookie. If a match is found, the method considers a service card triggering mapping exists for the IKE negotiation packet, and considers the node the sending node. If no match is found, the procedure ends.

i. If an entry that contains the Responder Cookie is found, the method considers a service card triggering mapping exists for the IKE negotiation packet, and considers the node the receiving node. Then, the method considers the IKE negotiation successful and triggers the service card to perform IKE negotiation.

ii. If no entry that contains the Initiator Cookie is found, the method considers an IKE negotiation error occurred, the whole negotiation procedure ends, or the method requests the peer to send an IKE negotiation packet again, and executes the procedure above.

② If yes, the method considers a service card triggering mapping exists for the IKE negotiation packet, and considers the node the sending node. Then, the method considers the IKE negotiation successful and triggers the service card to perform IKE negotiation.

At this step, because an ISAKMP response packet carries both the Initiator Cookie and Responder Cookie, the sending node has to check which Cookie is generated by itself. After the sending node receives the ISAKMP response packet, the method searches the IKE distribution table of the sending node for both cookies. At this step, the Initiator Cookie is found in the table of the sending node. Thus the node obtains the service card ID from the Initiator Cookie, and sends the ISAKMP response packet to the target service card.

At step 1406, if IKE negotiation is further needed, the service card sends an ISAKMP packet to the receiving node.

The following describes the IKE negotiation system of embodiment 5, as shown FIG. 11. The system comprises initiating apparatus 410 and responding apparatus 420. Initiating apparatus 410 is the sending node and responding apparatus 420 is the receiving node.

1. The initiating apparatus comprises transmitting and receiving unit 411, judging unit 412, pre-processing unit 413, service card 414, and storage unit 415. There can be one or more units for the same unit type.

1) Transmitting and receiving unit 411 receives data packets, sends the packet that is processed according to the established IPsec connection, or sends IKE negotiation initiating packets; and receives IKE negotiation packets.

2) Judging unit 412 checks the IPsec connection status to be used for sending the data packet that transmitting and receiving unit 411 receives. If the IPsec connection is set up, pre-processing unit 413 is triggered to process the packet according to this connection. If the connection is being negotiated, no operation is performed. If the IPsec connection has not been negotiated, pre-processing unit 413 triggers service card 414 according to a pre-configured policy; judging unit 412 receives the Initiator Cookie that pre-processing unit 413 obtains from the IKE negotiation packet, and checks if storage unit 415 saves the Initiator Cookie. If yes, judging unit 412 considers a service card triggering mapping exists for the received IKE negotiation packet. If no, no operation is executed.

3) Pre-processing unit 413 triggers a service card 414 according to a pre-configured policy; obtains the Initiator Cookie and Responder Cookie from the received IKE negotiation packet, after judging unit 412 considers a service card triggering mapping exists for the IKE negotiation packet, obtains the service card ID from the Initiator Cookie, and sends the IKE negotiation packet to the service card.

In actual implementation, judging unit 412 can obtain the Initiator Cookie and Responder Cookie from the IKE negotiation packet that transmitting and receiving unit 411 receives.

4) Service card 414, after being triggered, generates an Initiator Cookie that contains the service card ID, saves the Initiator Cookie to storage unit 415, generates an IKE negotiation initiating packet that carries the Initiator Cookie, and sends the packet to transmitting and receiving unit 411; performs IKE negotiation according to the received IKE negotiation packet.

Service card 414 comprises Cookie generation module 4141 and packet processing module 4142. Wherein, ① Cookie generation module 4141 is triggered to generate an Initiator Cookie that contains the service card ID, and provide Initiator Cookie to the storage unit 415.

② packet processing module 4142 generates an IKE negotiation initiating packet that carries the Initiator Cookie, and sends the packet to transmitting and receiving unit 411; performs IKE negotiation according to a received IKE negotiation packet.

5) Storage unit 415 saves the Initiator Cookie that contains the ID of the service card.

Judging unit 412 and storage unit 415 can be integrated into pre-processing unit 413. There can be one or more service cards 414.

Preferably, before checking if storage unit 415 has the Initiator Cookie, judging unit 412 receives the Responder Cookie that pre-processing unit 413 obtains from the IKE negotiation packet, and checks the type of the IKE negotiation packet. If the IKE negotiation packet carries both the Initiator Cookie and the Responder Cookie, judging unit 412 determines the IKE negotiation packet is the IKE negotiation response packet, and then continues to check if storage unit 415 has the Initiator Cookie.

2. The responding apparatus comprises transmitting and receiving unit 421, judging unit 422, pre-processing unit 423, service card 424, and storage unit 425. There can be one or more units for the same unit type.

1) Transmitting and receiving unit 421 receives IKE negotiation packets, and sends IKE negotiation response packets.

2) Judging unit 422 receives the Initiator Cookie and the Responder Cookie that pre-processing unit 423 obtains from the IKE negotiation packet, checks the content of the packet. If only Initiator Cookie is carried in the packet, judging unit 422 concludes that no service card triggering mapping exists for the IKE negotiation packet.

Because the packet carries only the Initiator Cookie, judging unit 422 also concludes that the packet is an IKE negotiation initiating packet.

3) Pre-processing unit 423 obtains the Initiator Cookie and Responder Cookie from IKE negotiation packet received by transmitting and receiving unit 421, and after judging unit 422 concludes no service card triggering mapping exists for the IKE negotiation packet, triggers service card 424 according to a pre-defined policy.

4) Service card 424, after being triggered, generates a Responder Cookie, provides the cookie to storage unit 425, generates an IKE negotiation response packet that carries the Initiator Cookie and the Responder Cookie, and then sends the IKE negotiation response packet to transmitting and receiving unit 421.

Service card 424 comprises Cookie generation module 4241 and packet processing module 4242.

① Cookie generation module 4241, after being triggered, generates a Responder Cookie that contains the service card ID, and provides the Responder Cookie to storage unit 425.

② packet processing module 4242 generates the IKE negotiation response packet that carries both the Initiator Cookie and the Responder Cookie, and sends the packet to transmitting and receiving unit 421.

5) Storage unit 425 saves the Responder Cookie after service card 424 generates the Responder Cookie that contains the service card ID.

Storage unit 425 can be integrated into pre-processing unit 423. There can be one or more service cards 424.

Preferably, if the received IKE negotiation packet contains the Initiator Cookie with the service card ID and the Responder Cookie, judging unit 422 can further check if storage unit 425 has the Responder Cookie. If yes, judging unit 422 concludes that storage unit 425 has a service card triggering mapping for the IKE negotiation packet.

Pre-processing unit 423 obtains the service card ID from the Responder Cookie, and sends the IKE negotiation packet to service card 424.

The IKE negotiation initiating apparatus and responding apparatus of embodiment 5 can be two independent apparatuses that form the IKE negotiation system, or they can coexist in one device. The device comprises initiating apparatus 410 and responding apparatus 420. The IKE device can be either a sending node or a receiving node depending on how it processes. If the IKE device receives an IKE negotiation response packet after sending an IKE negotiation initiating packet to the peer device, the IKE device is the sending node. If the IKE device sends an IKE negotiation response packet to the peer after receiving an IKE initiating packet, the IKE device is the receiving node. In actual applications, the structures of the two IKE devices can be the same.

The method and network nodes provided by embodiment 5 of the present invention trigger a service card according to a pre-configured policy to send an IKE negotiation packet in response to a received data packet, and save the service card triggering mapping for the IKE negotiation packet. Upon receiving an IKE negotiation packet, the method checks if a service card triggering mapping exists for the IKE negotiation packet. If no, the method triggers a service card according to a pre-defined policy to perform IKE negotiation, and saves the service card triggering mapping for the IKE negotiation packet. This method enables a node to distribute IKE negotiations to different service cards to perform IKE negotiation at the same time, improving IKE negotiation speed.

Figure 15:
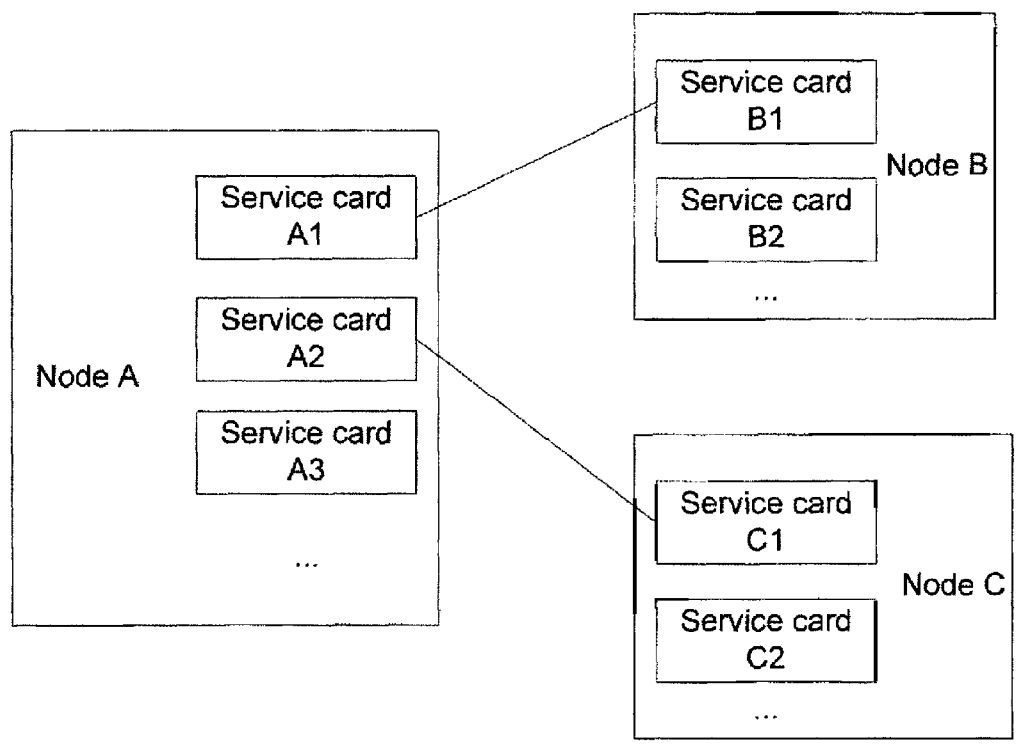
FIG. 15 is an application diagram of this invention.

The method, system, and apparatus embodiment 5 of this invention can bind an IKE negotiation to a service card. The following example describes the effect of the invention. FIG. 15 is an application diagram of embodiment 5. Network nodes A, B, and C are in the network. Service card A1 of node A and service card B1 of node B performs IKE negotiation. Service card A2 of node A and service card C1 of node C performs IKE negotiation. In other words, node A uses its service card A1 for IKE negotiation with node B, and uses its service card A2 for IKE negotiation with node C. This method enables node A to perform current IKE negotiations on different service cards rather than on one main card, to improve IKE negotiation speed. Before node A sends data to node B, node A uses service card A1 to negotiates with service card B1 of node B to set up an IPsec connection for data transmission.

This invention can be a computer program product that can run on different storage media (This invention does not exclude other implementation methods such as a hardware product). The technical personnel of this field can know from the content above that the computer program product comprises multiple instructions that enable the hardware platform (for example, the AC) to complete the methods mentioned. A device adopting this invention can comprise the computer program product and a hardware platform running this program.

Although several embodiments of the invention and their advantages are described in detail, a person skilled in the art could make various alternations, additions, and omissions without departing from the spirit and scope of the present invention as defined by the appended claims.

The invention claimed is:

1. A method for Internet key exchange (IKE) negotiation, comprising:

after receiving a data packet, selecting, by a first apparatus, one of multiple service cards comprised by the first apparatus according to a pre-configured policy, and triggering the selected service card to generate an Initiator Cookie and IKE negotiation initiating packet containing the Initiator Cookie, sending the IKE negotiation initiating packet to a second apparatus;

saving, by the first apparatus, the mapping between the Initiator Cookie and the service card;

receiving, by the first apparatus, an IKE negotiation response packet sent by the second apparatus, wherein the IKE negotiation response packet contains the Initiator Cookie and a Responder Cookie generated by the second apparatus, determining the service card corresponding to the Initiator Cookie contained in the IKE negotiation response packet, sending the IKE negotiation response packet to the service card, and saving the mapping among the Initiator Cookie, the Responder Cookie and the service card; and sending, by the service card corresponding to the Initiator Cookie and the Responder Cookie, a subsequent IKE negotiation initiating packet containing the Initiator Cookie and the Responder Cookie to the second apparatus to continue IKE negotiation.

2. The method of claim 1, wherein operation before selecting one of multiple service cards comprised by the first apparatus according to a pre-configured policy further comprises: checking the status of the IPsec connection to be used for sending a data packet, and if no IPsec connection is set up, proceeding to select a service card.

3. The method of claim 1, wherein selecting one of multiple service cards comprised by the first apparatus according to a pre-configured policy further comprises: adopting the Hash algorithm to compute the data packet, and selecting a service card with the ID equal to the calculation result; or selecting an idle service card; or selecting a service card in a preset order; or selecting a service card randomly.

4. The method of claim 1, wherein saving the mapping between the Initiator Cookie and the service card comprises: when a random generated value or a combination of the service card ID and a random generated value is used as the Initiator Cookie, saving the mapping between the generated Initiator Cookie and the triggered service card; or when a combination of the service card ID and a random generated value is used as the Initiator Cookie, saving the generated Initiator Cookie.

5. The method of claim 1, after the first apparatus received an IKE negotiation initiating packet, further comprising: if both Initiator Cookie and Responder Cookie are found in the IKE negotiation initiating packet, searching for a mapping among the Initiator Cookie, Responder Cookie, and a service card, if yes, considering a complete mapping exists between the received IKE negotiation initiating packet and the service card, and triggering the service card corresponding to the Initiator Cookie and the Responder Cookie to perform IKE negotiation; if no, searching for a mapping between the Initiator Cookie and a service card, and if yes, considering a partial mapping exists between the received IKE negotiation packet and the service card, and triggering the service card corresponding to the Initiator Cookie to perform IKE negotiation;

wherein the Initiator Cookie or Responder Cookie is a random value or a combination of the service card ID and a random value.

6. The method of claim 5, wherein operation after triggering the service card corresponding to the Initiator Cookie to perform IKE negotiation if considering a partial mapping exists between the IKE negotiation initiating packet and the service card further comprising: adding the Responder Cookie to the partial mapping to form a complete mapping among the Initiator Cookie, the Responder Cookie, and the service card.

7. The method of claim 1, after the first apparatus receives an IKE negotiation initiating packet; further comprising: if the IKE negotiation initiating packet carries both Initiator Cookie and Responder Cookie, checking if an entry contains the Initiator Cookie, and if yes, considering a mapping exists between the received IKE initiating negotiation packet and the service card;

wherein the Initiator Cookie or Responder Cookie is a combination of the service card ID and a random value.

8. The method of claim 7, wherein triggering the service card to perform IKE negotiation comprises: obtaining the service card ID from the saved Initiator Cookie, and triggering the service card to perform IKE negotiation.

9. A method for Internet key exchange (IKE) negotiation, comprising:

receiving, by a first apparatus, an IKE negotiation initiating packet sent by a second apparatus;

if an Initiator Cookie is found in the IKE negotiation initiating packet, selecting, by the first apparatus, one of multiple service cards comprised by the first apparatus according to a pre-configured policy, and triggering the service card to generate a Responder Cookie, sending an IKE negotiation response packet containing the Initiator Cookie and the generated Responder Cookie to the second apparatus, and saving a mapping among the Initiator Cookie, the Responder Cookie and the service card;

if both the Initiator Cookie and the Responder Cookie are found in the IKE negotiation initiating packet, searching for a mapping among the Initiator Cookie, the Responder Cookie and a service card, if yes, sending the IKE negotiation initiating packet to the service card corresponding to the Initiator Cookie and the Responder Cookie to perform IKE negotiation; if no, searching for a mapping between the Initiator Cookie and a service card; if yes, sending the IKE negotiation initiating packet to the service card corresponding to the Initiator Cookie to perform IKE negotiation; saving the mapping among the Initiator Cookie, the Responder Cookie and the service card; and receiving, by the service card corresponding to the Initiator Cookie and the Responder Cookie comprised by the first apparatus, a subsequent IKE negotiation initiating packet containing the Initiator Cookie and the Responder Cookie to continue IKE negotiation.

10. The method of claim 9, wherein selecting one of multiple service cards comprised by the first apparatus according to a pre-configured policy comprises: adopting the Hash algorithm to compute the IKE negotiation initiating packet, and selecting a service card with the ID equal to the calculation result; or selecting an idle service card; or selecting a service card in a preset order; or selecting a service card randomly.

11. The method of claim 9, wherein the Initiator Cookie or Responder Cookie is a random value or a combination of the service card ID and a random value.

12. The method of claim 9, wherein if there is the mapping among the Initiator cookie, the Responder Cookie and the service card, triggering the service card to perform IKE negotiation comprises: obtaining the service card ID from the Responder Cookie, and triggering the service card of this ID to perform IKE negotiation.

13. An apparatus for Internet key exchange (IKE) negotiation, comprising:

a transmitting and receiving unit, for receiving data packets, and sending an IKE negotiation initiating packet containing Initiator Cookie to a response apparatus; receiving an IKE negotiation response packet sent by the response apparatus, wherein the IKE negotiation response packet contains the Initiator Cookie and Responder Cookie generated by the response apparatus;

a pre-processing unit, for selecting one of multiple service cards comprised by the apparatus for IKE negotiation according to a pre-configured policy after the transmitting and receiving unit receives the data packets, and triggering the service card to generate the Initiator Cookie and the IKE negotiation initiating packet containing the Initiator Cookie; determining the service card corresponding to the Initiator Cookie contained in the IKE negotiation response packet, and sending the IKE negotiation response packet to the service card corresponding to the Initiator Cookie the service card, for generating the Initiator Cookie and the IKE negotiation initiating packet containing the Initiator Cookie after being triggered by the pre-processing unit; after receiving the IKE negotiation response packet sent by the pre-processing unit, sending a subsequent IKE negotiation initiating packet containing the Initiator Cookie and the Responder Cookie to the response apparatus to continue IKE negotiation; and a storage unit, for saving the mappings between the Initiator Cookie and the service card after the service card generates the IKE negotiation initiating packet containing the Initiator Cookie; saving the mapping among the Initiator Cookie, the Responder Cookie and the service card after the service card receives the IKE negotiation response packet.

14. The apparatus of claim 13, further comprising: a judging unit, for checking the status of the IPsec connection to be used to send the data packet received by the transmitting and receiving unit, wherein if the IPsec connection is set up, triggering the pre-processing unit to process the packet accordingly, if the connection is being negotiated, triggering no operation, and if IPsec negotiation is not started yet, triggering the pre-processing unit to select a service card according to a pre-configured policy;

wherein the transmitting and receiving unit sends the data packet according to the established IPsec connection; and the pre-processing unit processes the data packet according to the established IPsec connection.

15. The apparatus of claim 13, wherein the service card comprises:

a cookie generation module, which is triggered to generate an Initiator Cookie, and provide the mapping between the Initiator Cookie and its card ID to the storage unit; and a packet processing module, which generates an IKE negotiation initiating packet that carries the Initiator Cookie, sends the packet to the transmitting and receiving unit;

wherein the Initiator Cookie or Responder Cookie is a random value or a combination of the service card ID and a random value.

16. The apparatus of claim 15, further comprising a judging unit;

wherein the transmitting and receiving unit is further used for receiving an IKE negotiation initiating packet;

the judging unit is further used for, if the Initiator Cookie and the Responder Cookie are found in the IKE negotiation initiating packet, searching the storage unit for the mapping among the Initiator Cookie, the Responder Cookie and the service card;

if yes, considering a complete mapping exists between the received IKE negotiation initiating packet and the service card; if no, searching the storage unit for the mapping between the Initiator Cookie and the service card; if yes, considering a partial mapping exists between the received IKE negotiation initiating packet and the service card if a mapping being found;

the pre-processing unit is further used for obtaining the Initiator Cookie and Responder Cookie that the received IKE negotiation initiating packet carries when the judging unit found the complete mapping exists between the received IKE negotiation initiating packet and the service card, sending the received IKE negotiation initiating packet to the service card corresponding to the Initiator Cookie and Responder Cookie to perform IKE negotiation; when the judging unit found the partial mapping exists between the received IKE negotiation initiating packet and the service card, obtaining the Initiator Cookie that the received IKE negotiation initiating packet carries, and sending the IKE negotiation initiating, sending the IKE negotiation initiating packet to the service card corresponding to the Initiator Cookie to perform IKE negotiation, and adding the Responder Cookie to the storage unit;

the storage unit adds the Responder Cookie that is obtained from the IKE negotiation initiating packet to the Initiator Cookie-service card mapping to form a complete mapping.

17. The apparatus of claim 13, wherein the service card comprises:
a cookie generation module, which is triggered to generate an Initiator Cookie, and provide the Initiator Cookie to the storage unit;
a packet processing module, which generates an IKE negotiation initiating packet that carries the Initiator Cookie, and sends the packet to the transmitting and receiving unit;
a storage unit, which saves the generated Initiator Cookie;
wherein the Initiator Cookie or Responder Cookie is a combination of the service card ID and a random value.

18. The apparatus of claim 17, further comprising a judging unit;
wherein the transmitting and receiving unit receives an IKE negotiation initiating packet;
the judging unit is used for, if the Initiator Cookie and Responder Cookie are found in the received IKE negotiation initiating packet, checking if storage unit has the Initiator Cookie, if yes, considering that a mapping between the IKE negotiation initiating packet and the service card exists, and if no;
the pre-processing unit is further used for obtaining the Initiator Cookie and Responder Cookie that the received IKE negotiation initiating packet carries, obtains the service card ID from the Initiator Cookie when the judging unit determines the mapping between the IKE negotiation initiating packet and the service card exists, sends the IKE negotiation initiating packet to the service card of the card ID to perform IKE negotiation.

19. An apparatus for Internet key exchange (IKE) negotiation comprises:
a transmitting and receiving unit, for receiving an IKE negotiation initiating packet sent by an initiating apparatus;

a judging unit, for if both an Initiator Cookie and a Responder Cookie are found in the IKE negotiation initiating packet, searching for a mapping among the initiator Cookie, the Responder Cookie and the service card; if the mapping among the initiator Cookie, the Responder Cookie and the service card does not exist, searching for a mapping between the initiator Cookie and the service card;

a pre-processing unit, if the judging unit determines that the mapping among the Initiator Cookie, the Responder Cookie and the service card exists, sending the IKE negotiation initiating packet to the service card corresponding to the Initiator Cookie and the Responder Cookie to perform IKE negotiation; if the judging unit determines that the mapping between the Initiator Cookie and the service card exists, sending the IKE negotiation initiating packet to the service card corresponding to the initiator Cookie to perform IKE negotiation; if the Initiator Cookie is found in the IKE negotiation initiating packet, selecting one of multiple service cards comprised by the apparatus for IKE negotiation according to a pre-configured policy, triggering the service card to generate Responder Cookie, and sending an IKE negotiation response packet containing the initiator Cookie and the generated Responder Cookie;

the service card, for performing IKE negotiation after receiving the IKE negotiation initiating packet sent by the pre-processing unit; generating Responder Cookie and the IKE negotiation response packet containing the Initiator Cookie and the generated Responder Cookie after being triggered by the pre-processing unit;

a storage unit, for saving the mapping among the Initiator Cookie, the Responder Cookie and the service card.

20. The apparatus of claim 19,
wherein the service card comprises a cookie generation module that is triggered by the pre-processing unit to generate the Responder Cookie, and provide this Cookie to the storage unit;
the storage unit is used for saving the mapping between the Initiator Cookie and the service card, adds the Responder Cookie to the mapping between the Initiator Cookie and service card to form a complete mapping;
wherein the Initiator Cookie or Responder Cookie is a random value or a combination of the service card ID and a random value.

21. The apparatus of claim 19,
wherein the service card comprises:
a Cookie generation module, which is triggered by the pre-processing unit to generate the Responder Cookie, and provide this Cookie to the storage unit; and
a storage unit, which saves the Responder Cookie that the service card generates;
wherein the Initiator Cookie or Responder Cookie is a combination of the service card ID and a random value.

22. The apparatus of claim 20 wherein,
a transmitting and receiving unit receives IKE negotiation packets;
wherein a service card comprises a packet processing module, which generates an IKE negotiation response packet that carries the Initiator Cookie and Responder Cookie, and sends the packet to the transmitting and receiving unit.

* * * * *

UNITED STATES PATENT AND TRADEMARK OFFICE
CERTIFICATE OF CORRECTION

| | | |
|---|---|---|
| PATENT NO. | : 8,327,129 B2 | Page 1 of 1 |
| APPLICATION NO. | : 12/808978 | |
| DATED | : December 4, 2012 | |
| INVENTOR(S) | : Weichun Ren et al. | |

It is certified that error appears in the above-identified patent and that said Letters Patent is hereby corrected as shown below:

On the cover page:

At Item (75), inventor's name "Weichen" should be --Weichun--

Signed and Sealed this
Twelfth Day of March, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,327,129 B2 | Page 1 of 1 |
| APPLICATION NO. | : 12/808978 | |
| DATED | : December 4, 2012 | |
| INVENTOR(S) | : Ren et al. | |

It is certified that error appears in the above-identified patent and that said Letters Patent is hereby corrected as shown below:

On the Title Page, item (57), under "ABSTRACT", in Column 2, Line 11, delete "of the IKE" and insert -- the IKE --, therefor.

On the Title Page, item (57), under "ABSTRACT", in Column 2, Line 12, delete "node a node to" and insert -- node to --, therefor.

In the Claims,

In Column 24, Line 25, in Claim 13, delete "Cookie" and insert -- Cookie; --, therefor.

Signed and Sealed this
Twenty-fifth Day of November, 2014

Michelle K. Lee
*Deputy Director of the United States Patent and Trademark Office*